United States Patent [19]

Kopec et al.

[11] Patent Number: 5,321,773
[45] Date of Patent: Jun. 14, 1994

[54] IMAGE RECOGNITION METHOD USING FINITE STATE NETWORKS

[75] Inventors: Gary E. Kopec, Belmont; Philip A. Chou, Menlo Park, both of Calif.

[73] Assignee: Xerox Corporation, Stamford, Conn.

[21] Appl. No.: 805,700

[22] Filed: Dec. 10, 1991

[51] Int. Cl.⁵ .............................. G06K 9/62
[52] U.S. Cl. ...................... 382/30; 382/14; 382/37
[58] Field of Search .......... 382/30, 34, 56, 37, 382/36, 39, 14, 15; 395/10, 50, 63

Primary Examiner—Joseph Mancuso
Attorney, Agent, or Firm—Rosen, Dainow & Jacobs

[57] ABSTRACT

An image recognition system, in particular for document image recognition, using an imaging model employing a 2-dimensional finite state automaton corresponding to a regular string grammar. This approach is not only less computationally intensive than previous grammar-based approaches to document image recognition, but also can handle a wider variety of image types. Features of the imaging model include a sidebearing model of glyph positioning, an image decoder based on linear scheduling theory for regular interative algorithms, the combining of overlapping image subregions, and a least-squares estimation procedure for measuring character parameters from character samples in the image.

26 Claims, 22 Drawing Sheets

FIG. 1

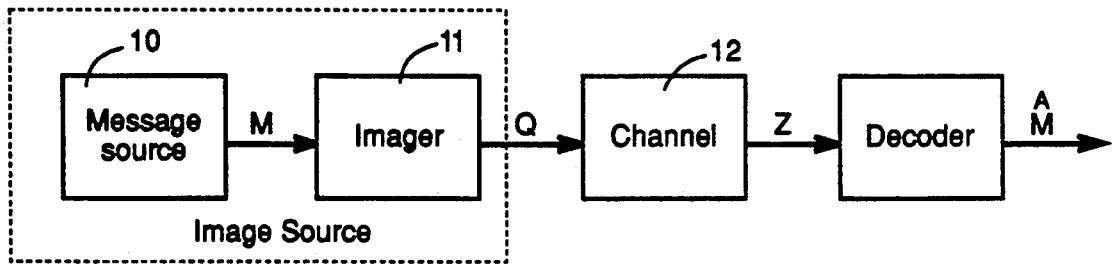

FIG. 2(a)

Document Image Decoding Using Regular Grammars
Gary E. Kopec
Phil A. Chou
Xerox Palo Alto Reasearch Center
Abstract
This paper describes
a communication theory approach to document image recognition,
patterned after the use of hidden Markov models in speech recognition.

FIG. 2(b)

\title {Document Image Decoding Using Regular Grammars}
\author {Gary E. Kopec \\
Phil A. Chou}
\affiliation {Xerox Palo Alto Research Center}
\abstract {This paper describes
a communication theory approach to document image recognition,
patterned after the use of hidden Markov models in speech
recognition.}

FIG. 2(c)

G-3Tc{=1
Qe1g1b1SS=2Qe1g1b1SSS=2Hg1b1e2SS=3|=1
Qf1b1d2SS = 2Qe1f1c2SSs=2Hd1f1b1SS=3|=1
Qc1e1a1SsF8=1Qc1e1a1SSs=2Qe1a1c2SsF8=1Qe1a1c2SSs=2Qe1a1c2SSs=2|=1
Qd1g1b1SS=2Qbf1a1SSs=2Hbe1g1SS=1
$<10110001101

[$a_t$] transition probability
$Q_t$ template
$m_t$ message
$\Delta_t$ displacement

FIG. 12(a)

The broad goal of the document recognition project is to provide understanding and technology for supporting a seamless interface between iconic and symbolic representations of information. A major motivation is to expand the class of representations that can be manipulated by document-processing systems to include scanned document images. This goal is being pursued through a combination of basic research in machine perception, signal processing and interpretation, and development of architectures for demonstrating recognition technology and incorporating it into end-user applications.

FIG. 12(b)

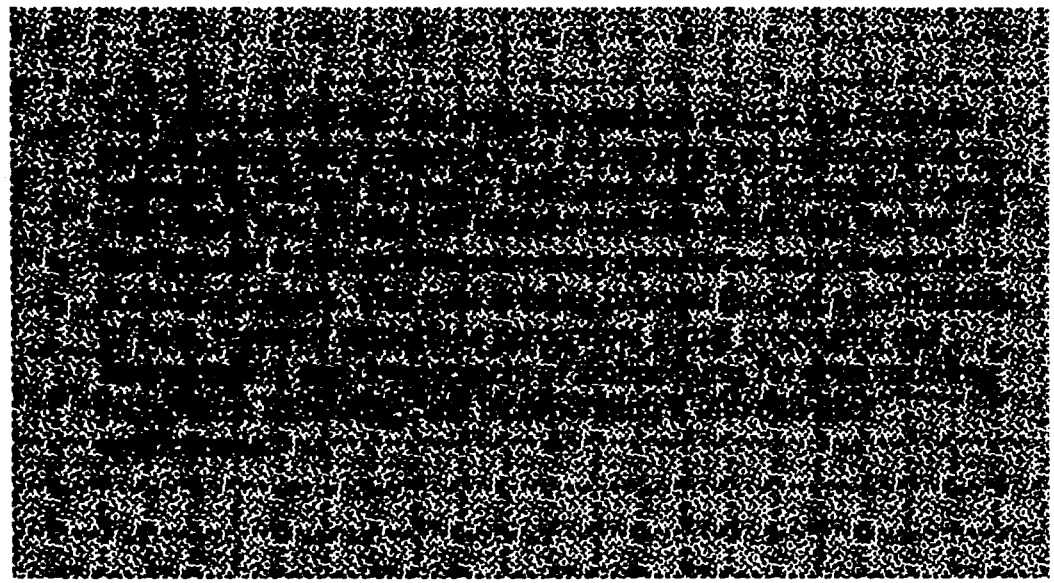

FIG. 13

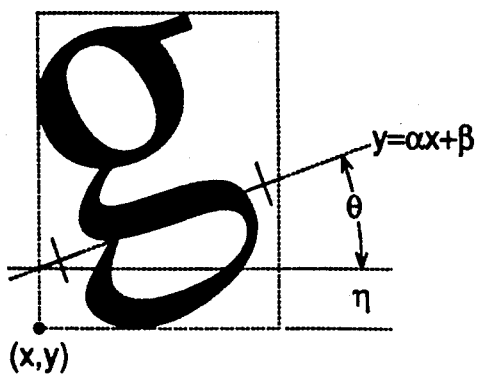

FIG. 14 aabbccddeeffgghhiijjkkllmmnnooppqqrrsstt
athccrdqefjogabmiljkkjliambagafpeqdscebta
uuvvwwxxyyjjAABBCCDDEEFFGGHHIIJJKKLLMMNN
aNLHcLdKcJflgHLG:FjEkDlCmBaAojfyqesweuta
OOPPQQRRSSTTUUVVWWXXYYZZ!!;:,,..:;??[[]]
a]u[w?x:y.j,A;B!C2DYEXFWGVHUITJSKRLQHPNO
11223344556677889900
OOP9Q8R7S6T5U4V3W2X1
uaY:fAIFjECLu:LECcUIaAGHJj:ULcVBJNO2,ZAm·
jujLs?ULV8?jBHj;a.1uf2f.OGjt[j6XRfLV]?ma
6ELLwQejFg8NAL22Do[OHR11auG.88qk1LWLq;Fc
LLCHGNBGujH,LD8um;D!8IBRc2;HLm7H8:LOm2FA
f:R[SFBOH1RuL9a9KHc!:?VcUu.8CVLqajL6tL7B
uDma;ef,AjkjcFju3ONYS61[cB2T9auSB:L]cR8a
,KiJaasBHUSJLPj:OjQf!2NjULLFjNtFfSu9juLA
aru66BEGquH9EAfTU!9jGj[U[H3EKqjP3HSL]uu2
aDSLwt.RY1.Y42JLHaqQV8H:KFQCEmA!umLHLc5
jyU[cGttkKFUTSN[QLu!1THfLA:V8qYREPuq2T2:
G6Lu[S2LG?kcuS9,samufkm3AY;!H7RHc:34jL?L
Y]uF1.w830Lu?2607j2u9[0F4qRCVu::L,H2?2j0
]BB[jAJXcK1,2TKS44TQ8qG!SYNjfIN:LCUHM2?:
K8a8uu4QmE?];j2GX1[SAELT;2Q4W?100u44PRuD
L[L,O.L;FOjNHQD7K,L;E3JBTOFcLNG]?a]3!jfB
u9FLAIA9:yLO;.:NqR.SA9[tuSR9?qCODuaTmuf
c?8]yVjK;JYmF.1BT[LWHjLuyFQLHN1uuHGcLjVH
W4DRIJ2HFLsOV2u6DfP:jqqaLPcatiaKm]8;30j1
?HJQ3EB[8uSC[U:0uOLuf?f9XOt;WCIm:1F9:uK;
HjOcSTcH7cNmVj4yLL1kQJV]33[O:8YKL1BCH2LL
uR!S4:TSu8u9BB9jES wi]JuajSPLX4Xu2yO3L?uw
X32YfEt7fOS17;Kuf1X?A.NUj]LKCSu]u!aF;Wju
O1Ktl;BEc4Lj2KHLL8OL8uj3CSfstTK?QyJUO:Lu
cjJPO4LLOS8OEYA,,c!DFR2LSAaE:P:uL5aNK,W
4fL98yH2L7OGf2jLEDVFR[;BL32u9;N2u2.OC8Vc
.V22D2FcY9,ILL5fU;FUyGLTUa1u2JCLTfLtS6uG
H!SL6[TucEK[mA!qu!WXAqmKE:SuA,2.2mmHHB:a
K:O2HjLNj4[uJuuL:tBfcLt1uu8S2BN.JLVjD;8S
?BJY44TC1JuuLYuflGSHSE8SfYUffjuV3Euu4jFc
DHuf0!jUu!S98clt6Sj.S]2[]PwR8uV;ug:BO:CT
1uuYLCYtXEEcXSm[D6A2Lc1q]9Vj:4:REfUHNSPS
u4WD2RE6Wc9[uVL2fAJ2S,RPcScNXuyRyXOjLuIL

FIG. 15

The broad goal of the document recognition project is to provide understanding and technology for supporting a seamless interface between iconic and symbolic representations of information. A major motivation is to expand the class of representations that can be manipulated by document processing systems to include scanned document images. This goal is being pursued through a combination of basic research in machine perception, signal processing and interpretation, and development of architectures for demonstrating recognition technology and incorporating it into end user applications.

FIG. 18(a)

The broad goal of the document recognition project is to provide understanding and technology for supporting a seamless interface between iconic and symbolic representations of information. A major motivation is to expand the class of representations that can be manipulated by document processing systems to include scanned document images. This goal is being pursued through a combination of basic research in machine perception, signal processing and interpretation, and development of architectures for demonstrating recognition technology and incorporating it into end user applications.

FIG. 18(b)

The broad goal of the document recognition project is to provide understanding and technology for supporting a seamless interface between iconic and symbolic representations of intormation. A major motivation is to expand the class of representations that can be manipulated by document processing systems to include scanned document images. This goal is being pursued through a combination of basic research in machine perception, signal processing and interpretation, and deveIopment of architectures tor demonstrating recognition technoIogy and incorporating it into end user applications.

FIG. 16(a)

*The broad goal of the document recognition project is to provide understanding and technology for supporting a seamless interface between iconic and symbolic representations of information. A major motivation is to expand the class of representations that can be manipulated by document-processing systems to include scanned document images. This goal is being pursued through a combination of basic research in machine perception, signal processing and interpretation, and development of architectures for demonstrating recognition technology and incorporating it into end-user applications.*

FIG. 16(b)

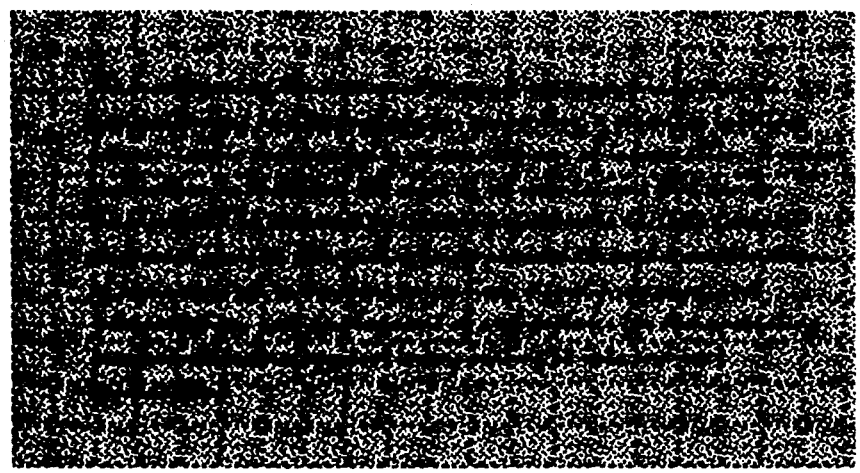

FIG. 17

The broad goal of the document recognition project is to provide understanding and technology for supporting a seamless interface between iconic and symbolic representations of information. A major motivation is to expand the class of representations that can be manipulated by document processing systems to include scanned document images. This goal is being pursued through a combination of basic research in machine perception, signal processing and interpretation, and development of architectuses for demonstrating recognition technology and incorposating it into end user applications.

FIG. 19(a)

Interference Spectrum [*electr*] Frequency distribution of the
jamming interference in the propagation medium external to the receiver.

Interflow [*hyd*] The water, derived from precipitation,
that infiltrates the soil surface and then moves laterally through
the upper layers of soil above the water table until it reaches a
stream channel or returns to the surface at some point downslope from
its point of infiltration.

Interlude [*adp*] A small routine or program which is designed
to carry out minor preliminary calculations or housekeeping operations
before the main routine begins to operate and which can usually be
overwritten after it has performed its function.

FIG. 19(b)

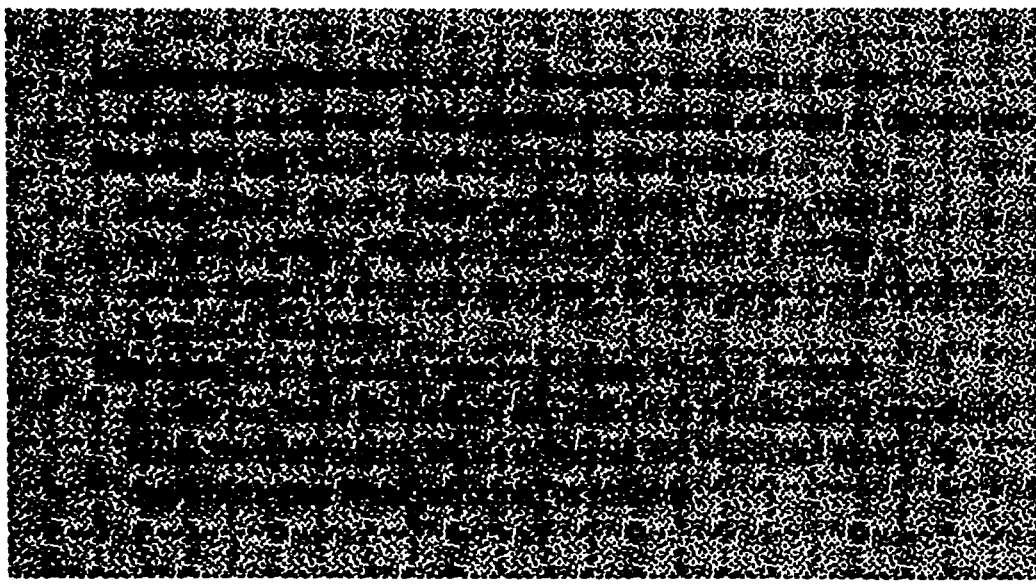

FIG. 21

```
\entry{
\name{interference spectrum}
\field{electr}
\body{Frequency distribution of the
jamming interference in the propagation medium external to the receiver.}
}
\entry{
\name{interflow}
\field{hyd}
\body{The water, derived from precipitation,
that infiltrates the soil surface and then moves laterally through
the upper layers of soil above the water table until it reaches a
stream channel or returns to the surface at some point downslope from
its point of infiltration.}
}
\entry{
\name{interlude}
\field{adp}
\body{A small routine or program which is designed
to carry out minor preliminary calculations or housekeeping operations
before the main routine begins to operate and which can usually be
overwritten after it has performed its function.}
}
```

FIG. 23

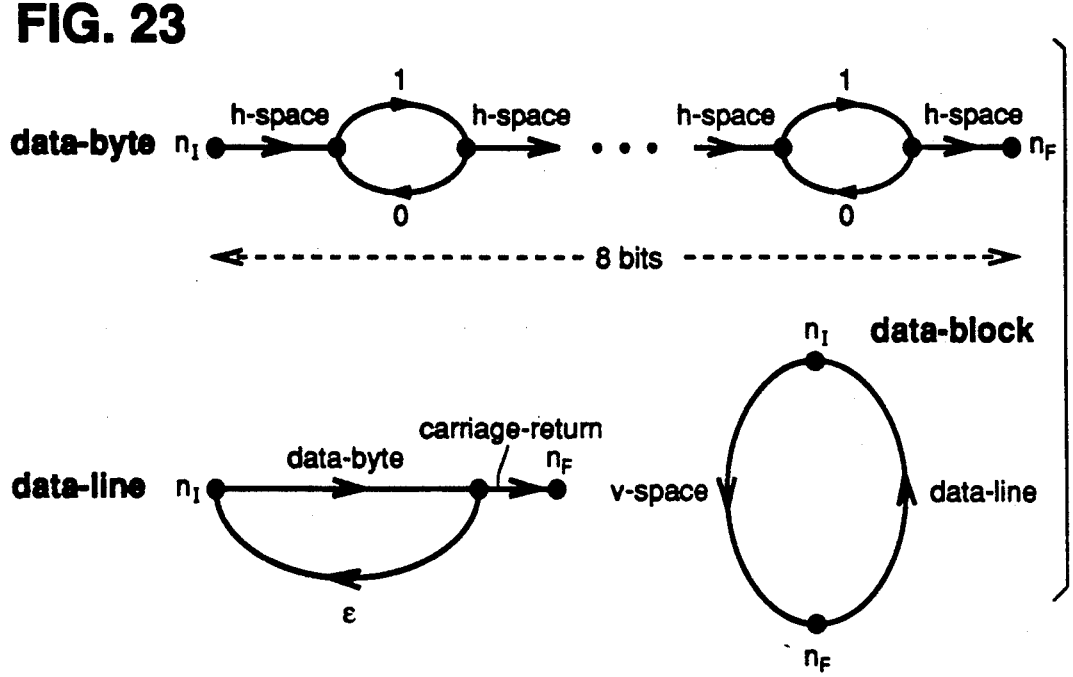

FIG. 24

The broad goal of the document recognition project is to provide understanding and technology for supporting a seamless intervace between iconic qnd symbolic representations of information. A major motivation is to expand the class of representations that can re manipulated by document-processing systems to include scanned document images. This goal is being pursued through a combination of basic research in machine perception, signal processing and interpretation, and development of architectures for demonstrating recognition technology and incorporating iu into end-user applications.

FIG. 28

| Step | Start Node | Start Position | Character | Image | End Node | End Position |
|------|------------|----------------|-----------|-------|----------|--------------|
| 1 | 205 | (0,0) | b | | 210 | (1,0) |
| 2 | 210 | (1,0) | a | | 210 | (2,1) |
| 3 | 210 | (2,1) | a | | 210 | (3,2) |
| 4 | 210 | (3,2) | $ | | 215 | (3,2) |
| 5 | 215 | (3,2) | — | | 220 | (4,0) |

IMAGE RECOGNITION METHOD USING FINITE STATE NETWORKS

This invention relates to an image generation and recognition system, and in particular to such a system of the type that can be characterized as an intelligent object recognition system.

BACKGROUND OF THE INVENTION

Reference is made to a U.S. Pat. No. 5,020,112, and to a related publication by one of us (Chou) in SPIE, Vol. 1199, Visual Communications and Image Processing IV, pages 852–863 (1989), whose contents are herein incorporated. The patent describes a background which equally applies here, and explains the difference between object recognition with and without distinguishing the underlying structure in the image, the former being referred to as intelligent image recognition. Both the patent and the paper describe intelligent recognition of a bitmapped binary image file generated by any commercial scanning device, and goes on to describe a method, including the code in an appendix of the patent, for processing this binary image to intelligently recreate the hard copy source document from which the binary image file was generated.

The paper in particular describes how such binary images are decoded, using a stochastic type of grammar that has proved of value in speech recognition. The conclusion reached by the author was that, for this particular application of recognition systems, i.e., image instead of speech, a stochastic grammar of the context-free type is most suitable, and regular stochastic grammars, despite the latter's inherent shorter parsing time, are unsuitable.

It will be appreciated that any graphics system is based on an imaging model, which is the set of rules that determine how the image of an object is generated from a description of the object's underlying structure, and the formal grammars used to parse the resultant pixel image are based on that same imaging model.

Previous attempts to use formal grammars to describe a 2-dimensional (2-d) image structure, as in the referenced patent and paper (see also Tomita, ACM International Workshop on Parsing Technologies, 1989), have all taken the approach of generalizing 1-dimensional (1-d) formalisms by replacing the notion of a 1-d phrase with the notion of a 2-dimensional (2-d) rectangular region. The resulting grammar rules typically describe how a region corresponding to some phrase is formed by combining a pair of horizontally or vertically abutting subregions. Rectangular subregions may be combined only if they do not overlap and if their dimensions and relative positions are such that the composite region is also rectangular. One disadvantage of this approach is that the 2-d counterparts to regular (finite-state) string grammars are not particularly useful for image modeling, with the result that only context-free 2-d grammars have been investigated. As mentioned in the paper, the computational consequence of using a context-free grammar is that parsing time, in general, is $O(n^3)$ in the number of terminal symbols (e.g. pixels), compared with $O(n)$ for regular grammars. As a result, applying context-free grammars directly to image pixels does not produce a particularly practical system.

Moreover, an imaging model based on the requirement that regions do not overlap, is a minor problem in applying this approach to images of text or equations since characters (e.g. 'j') may have negative sidebearings, and is a significant impediment to applying this approach to more complex graphical images, such as music notation. Another disadvantage of these previous attempts is that a recognition grammar is typically validated by using it to recognize examples of the images being modeled. This process can be time-consuming and inconvenient if recognition time is long.

SUMMARY OF INVENTION

An object of the invention is a grammar-based image modeling and recognition system that requires less time to process or decode a binary image, or to validate the recognition grammar.

Another object of the invention is a grammar-based image modeling and recognition system that can handle complex graphical images, such as music notation.

The invention is based on an imaging model that allows a finite state automaton to be used for a large variety of images, including text, equations, music, and printed digital data.

In the prior art as exemplified by the Chou paper, the term "grammar" is used to define a formal set of productions or production rules as used in compilers for converting the bitmap image pixels into characters or other recognizable blobs in the reconstruction process. Grammars represented as a set of productions are not well suited for use in our invention. We prefer in place of the term "grammar" to use the expression "finite state networks", which correspond to a regular grammar, to represent the device or means for converting the document into the bitmap or to recognize and reconstruct the document from the bitmap. It is preferred that the finite state networks used in the recognizer are the same as those used in the imager to create the bitmap images, in which case the computation time is minimized and accuracy maximized. However, the invention is not so limited. The recognizer of the invention can still recognize bitmap images created in other ways, provided that it has access to the appropriate set of image templates of the characters present in that image. For example, if the recognizer knows or is instructed that the characters in the bitmap are 12 pt Courier, then the recognizer can use standard typographic image templates of that font in the recognition process. If the imager did not use the same finite state networks, and the characters or other blobs cannot be associated with standard typographic image templates, it will still be possible to recognize and reconstruct the document provided that samples of each of the characters or blobs, preferably in pairs, are furnished from which the font metrics can be estimated in accordance with an aspect of our invention and suitable templates created. The accuracy with which the templates are created will determine the accuracy of the reconstruction, and that can be tested using the furnished samples, and the templates adjusted, if necessary, on a trial and error basis until the desired level of accuracy is achieved. It will therefore be further evident from the foregoing that the font metric estimation procedure can but needn't be used in the recognizer of the invention if the same finite state networks were used in the imager or the use of standard image templates would suffice.

There are a number of important features of the present invention which are briefly summarized below:

1. A finite-state model of image generation is used which will describe the structure of a large class of images (text, music, equations) in a form adequate for image recognition. This model is procedural and resembles, in spirit, a greatly simplified version of Postscript. In particular, it is based on the sidebearing model of character positioning which is widely used in digital typography.

2. A method is provided for automatically producing an image decoder or recognizer for some class of images from a generator expressed as a model of the type mentioned above. Automatically producing a recognizer from a generator involves automatically producing a schedule for computing a set of recursively-defined functions. The basic concept is based on linear scheduling theory for regular iterative algorithms as developed and described in the published literature in the VLSI field.

3. A modification of the bitmap matching function described in the referenced paper is used. This approach allows a relaxed set of constraints on overlap of image components. The components of an image must have disjoint support, rather than disjoint bounding boxes. In the language of parsing two-dimensional image grammars, this means that overlapping sub-regions or overlapping rectangular bounding boxes may be combined as long as their black pixels do not overlap. Bounding boxes and rectangles play no particular role in the approach of the invention. The relaxed constraints are a consequence of a simple normalization of the likelihood function used for image match scoring. This allows scores used in the stochastic process for subcomponents of an image to be combined by simple addition.

4. Compared with previous approaches to document recognition, the method of the invention requires more detailed information about typographic parameters such as character sidebearings and baseline depths. A method is employed for obtaining the more detailed character models required by the above image generator and recognizer from images containing samples of the characters. This involves estimating the font metrics such as sidebearings and baseline depth parameters using a least-squares estimation procedure from images containing samples of the characters.

In the description that follows, the term "character" is used from time to time. Unless the context indicates otherwise, the term "character" is to be given the broadest possible interpretation to include symbols generally, not only alphanumeric symbols, but also "glyphs", symbols that convey information non-verbally, as well as "blobs", connected black pixel regions, with which "character" will occasionally be used interchangeably.

These and further objects and advantages of the invention will be best understood in connection with the detailed description that follows of several embodiments of the invention, taken in conjunction with the accompanying drawings.

SUMMARY OF DRAWINGS

In the drawings:

FIG. 1 is a block diagram showing a formulation of the document recognition problem;

FIGS. 2(a), 2(b) and 2(c) show three examples of message fragments;

FIGS. 12(a) and 12(b) show, respectively, a sample text column and its noisy image;

FIG. 13 shows a typographic model of character vertical alignment;

FIG. 14 shows a font sample image;

FIG. 15 shows the decoded message obtained from the image in FIG. 12(b) using the system of the invention;

FIGS. 16(a) and 16(b) show, respectively, a Mistral sample image and its noisy version, and FIG. 17 the decoded message using the system of the invention;

FIGS. 18(a) and 18(b) show decoded versions of the same scanned image using different font models;

FIGS. 19(a) and 19(b) show, respectively, clean and noisy images of a dictionary page;

FIGS. 22(a) and 22(b) and 23 and 24 show, respectively, a data block, its noisy image, the grammar used in accordance with the invention to decode the noisy image, and the resultant decoded output;

FIG. 28 shows step-by-step construction of the resultant output image bitmap for the string of FIG. 28;

DETAILED DESCRIPTION OF PREFERRED EMBODIMENTS

Figure 3A:
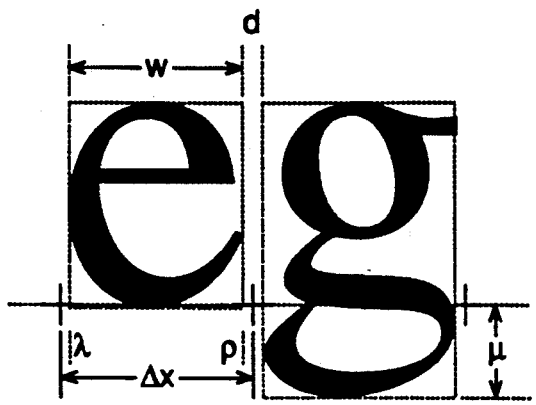
FIG. 3 shows a simplified version of a sidebearing model for describing character shape and positioning.

A detailed explanation of the invention requires the use of much mathematics and mathematical analysis. Some of this mathematics is based on information previously published and not original with the inventors, and some is not. The implementation of the system is assisted by an understanding of the mathematical development, but it does result in a document that is difficult to read and understand. For this reason, some of the mathematical development has been relegated to a series of annexed appendices A–D to which the mathematically inclined reader is directed. Some of the mathematical development is necessary to define some aspects of the invention. To avoid claims with an inordinate amount of equations, parts of the mathematical development have been labelled, and the thus-defined labels used in the claims, and it should be understood that the use of the label incorporates by reference the corresponding mathematical description.

As should be clear from the preceding Summary of the Invention, a finite state automaton, corresponding to a regular grammar, as such is well-known in the art, as are those of the stochastic type employing Hidden Markov Models both for speech and character recognition.

See, for example, the papers by Vlontzos and Kung in Proc. IEEE Int. Conf. on Neural Networks, San Diego, July 1988, their 1989 paper published in IEEE International Conference on Acoustics, Speech, and Signal Processing, pp. 1719-1722, May 23-26, 1989, and in particular the references cited in the latter which detail the nature and implementation of the Hidden Markov Model approach to speech and character recognition, and we claim no novelty with respect to that subject matter. Our invention has to do with the imaging model used and how the characters are analyzed, which allows use of the known principles of finite state automata for interpretation. Hence, for the most part, known subject matter will be incorporated either in the annexed Appendices or by reference to publications, and the main body of this detailed description will focus on the imaging model and character analyzing aspect which underlies the system of the invention.

Formulation of the document recognition problem based on classical communication theory is detailed in Appendix A, and shows that the solution lies in developing a proper model of the image source, understanding the channel characteristics, and using a computationally efficient search algorithm.

The image source model combines the effects of the message source 10 and the imager 11 (FIG. 1). Our approach to source modeling is to use the sidebearing model (R. Rubenstein, Digital Typography, 1988, Reading: Addison-Wesley) of character shape description and letterspacing. This model is used widely in digital typography and is formalized in page description languages such as PostScript (Adobe Systems Inc., PostScript Language Reference Manual, second edition, 1990, Reading: Addison-Wesley). We just very briefly review character shape and letterspacing and then formally define our image source model.

FIG. 3 depicts a simplified version of the sidebearing model for describing character shape and positioning. The shape of a character is defined in terms of a local coordinate system aligned so that the origin of the character, indicated by crosses, is at (0,0). The set width of a character is the vector displacement $\bar{\Delta}' = [\Delta x, \Delta y]$ from the character origin to the point at which the origin of the next character is normally placed when imaging consecutive characters of a word. Vectors are column vectors and ' denotes transpose. In most Indo-European alphabets, including Roman, $\Delta x > 0$ and $\Delta y = 0$. In other writing systems, however, $\Delta x$ may be negative (e.g. Semitic) or $\Delta y$ may be non-zero (e.g. Oriental glyphs). When $\Delta y = 0$, the character origins in a line of text are colinear and define the baseline of the text line. The bounding box of a character is the smallest rectangle, oriented with the character coordinate axes, which just encloses the character. The width of a character is the corresponding dimension w of the bounding box. The left sidebearing is the horizontal displacement $\lambda$ from the origin of the character to the left edge of the bounding box. It is possible to generalize sidebearings to be vector displacements. Vector sidebearings are supported by PostScript, for example, but are seldom used. Similarly, the right sidebearing is the horizontal displacement $\rho$ from the right edge of the bounding box to the origin of the next character. The depth below baseline is the vertical distance $\mu$ from the character origin to the bottom of the character bounding box. Similarly, the height above baseline is the vertical distance from the character origin to the top of the character bounding box.

SIDEBEARING MODEL

The horizontal component of set width is related to the sidebearings and bounding box width by the relation $$\Delta x = \lambda + w + \rho \qquad (10)$$

Similarly, the sidebearings are related to the intercharacter spacing d by the relation $$\rho_l \lambda_r = d \qquad (11)$$

where the subscripts l and r indicate the left and right characters of a pair, respectively.

BOUNDING BOXES

Figure 3B:
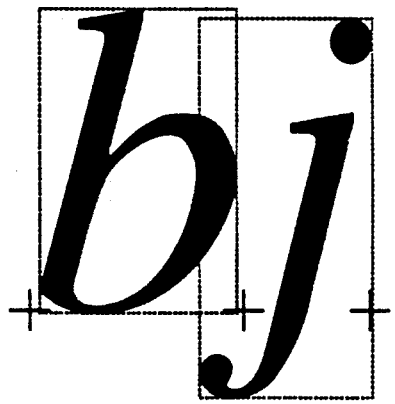
Figure 4:
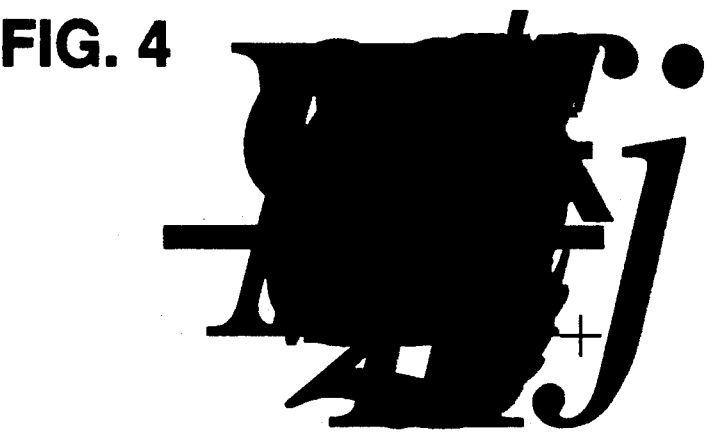
FIG. 4 shows the superposition of several characters.

One or both of the sidebearings may be negative. For example, the left sidebearing of 'j' in FIG. 3(b) is negative, with the result that the bounding boxes of the 'b' and 'j' overlap. However, as FIG. 3(b) suggests, typefaces are typically designed so that even if adjacent character bounding boxes overlap, the characters themselves do not. We formalize this observation as follows. Let $Q \in \mathcal{F}$ be a character template drawn from some font $\mathcal{F}$. Let $Q[\bar{x}_0]$ denote Q shifted so that its origin is located at $\bar{x}_0$. Define $$G_R = \bigcup_{Q \in F} Q[-\bar{\Delta}_Q] \qquad (12)$$

to be the right greeking of F. (We will not distinguish between a binary image and the set of pixels where the image is non-zero [the support of the image], using, for example, Q to denote both. The intended meaning should be clear from context. Furthermore, we will use set operator notation to denote the obvious binary image operations which correspond to applying the set operations to image supports.) Loosely, $G_R$ is the superposition of font characters aligned on the right. The observation about nonoverlap of characters may then be formalized as the condition that $$Q \cap G_R = \phi \qquad (13)$$

for each $Q \in F$ were $\phi$ denotes the empty set. This in FIG. 4. The origin of the 'j' is indicated by the cross. The gray region is the superposition of all characters from the font, each character right-aligned with the origin.

MARKOV SOURCES

Figure 5:
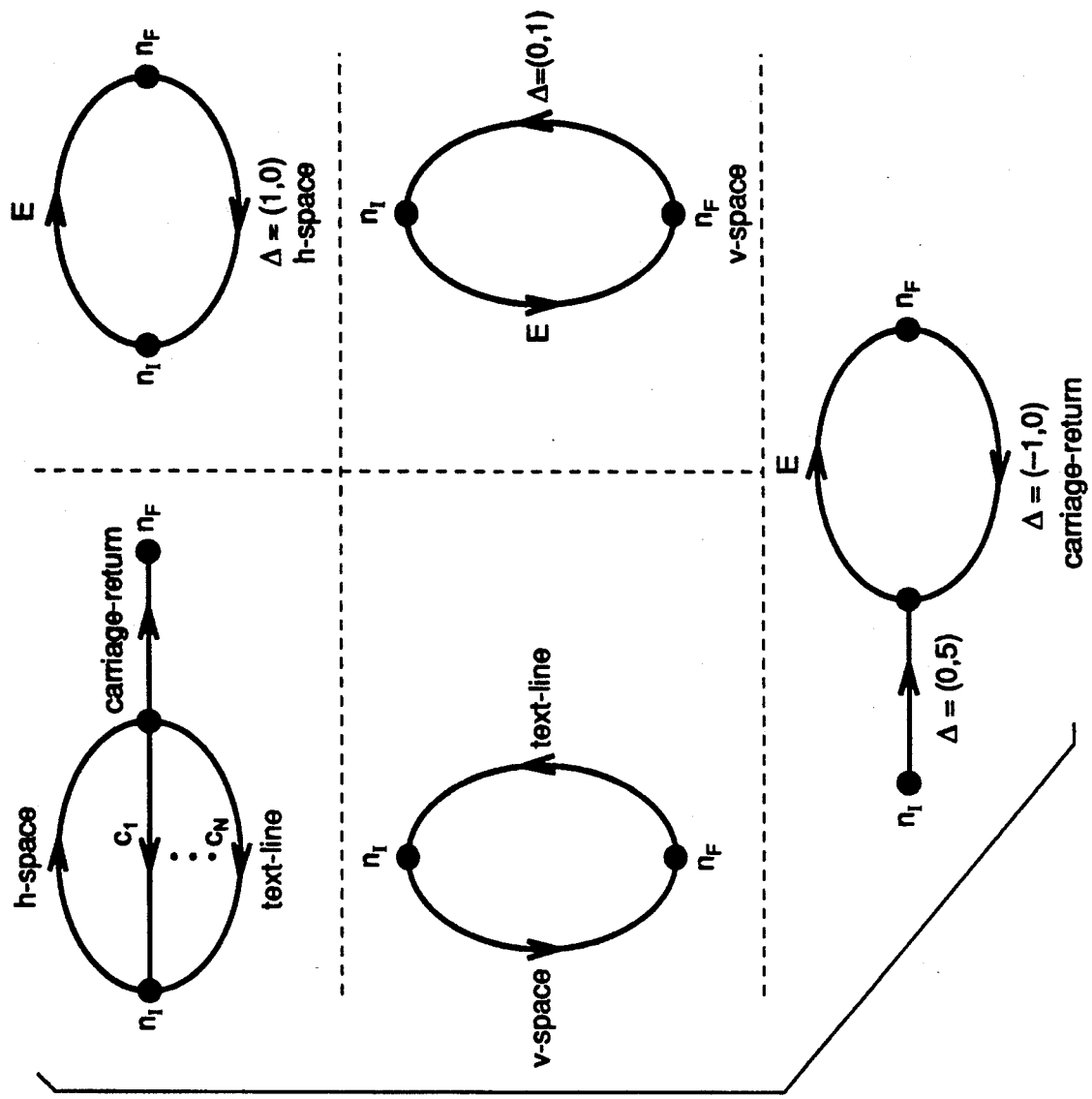
FIG. 5 shows an example of a text column grammar expressed as a finite-state network.

Our approach to source modeling is also based on the use of well-known stochastic finite-state grammars represented as networks (Markov sources). Again, by way of introduction, FIG. 5 shows an informal representation of a simple grammar, expressed as a set of state transition diagrams, for a column of text. (The notation used is defined more fully below). The initial and final states of each network are labeled $n_I$ and $n_F$, respectively. Vertically, a text-column consists of an alternating sequence of text-line and v-space regions. A v-space is a variable-length block of whitespace which consists of zero or more blank pixel rows. A text-line is a horizontal arrangement of alternating h-space and characters drawn from some font, terminated with a carriage return. More sophisticated grammars might embody a language model which constrains the possible character sequences in a text-line. For example, the common use of word lexicons to improve OCR accuracy is easily incorporated in this framework.

Figure 6:
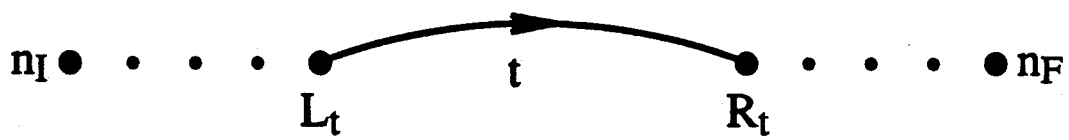
FIG. 6 is a model of a Markov source.

The structure of a set of images is captured formally by modeling image generation as a Markov source, as depicted in FIG. 6. A Markov source consists of a finite set of states (nodes, vertices) N and a set of directed transitions (branches, edges) T. Each transition t connects a pair of states $L_t$ and $R_t$, which are called, respectively, the predecessor state and the successor state of t. Two distinguished members of N are the initial state $n_I$, and the final state $n_F$. With each node n is associated a non-negative initial probability $p_m^0$, where $$\sum_{n \in N} p_n^0 = 1 \tag{14}$$

Typically, $p_n^0 = 1$ for the initial state $n_I$ and $p_n^0 = 0$ for all other nodes.

ATTRIBUTES

With each transition t is associated a 4-tuple of attributes, $(Q_t, M_t, a_t, \vec{\Delta}_t)$, where $Q_t$ is the template, $M_t$ is the message string, $a_t$ is the transition probability and $\vec{\Delta}_t$ is the vector displacement of t (analogous to set width for characters). Displacement is associated with transitions, rather than templates, partly in order to accommodate context-dependent spacing rules such as pairwise kerning. A path $\pi$ in a Markov source is a sequence of transitions $t_1 \ldots t_p$ for which $$R_{ti} = L_{ti+1} \tag{15}$$

for $i = 1 \ldots P-1$. A complete path is a path for which $L_{t1} = n_I$ and $R_{tP} = n_F$. A cycle or loop is a path $t_1 \ldots t_p$ for which $L_{t1} = R_{tP}$.

Associated with each path $\pi$ is a composite message $$M_\pi = M_{t1} \ldots M_{tp} \tag{16}$$

formed by concatenating the message strings of the transitions of the path. The set of possible messages generated by an image source is a regular language and the source model itself is a finite-state automaton which accepts that language. A Markov source defines a probability distribution on paths by $$P_r\{\pi\} = pL_{t1}^0 \prod_{i=1}^{P} a_{ti} \tag{17}$$

and induces a probability distribution on messages by $$P_r\{M\} = \sum_{\pi | M_\pi = M} P_r\{\pi\} \tag{18}$$

where $M_\pi$ is the message associated with path $\pi$.

Also associated with each path $\pi$ is a sequence of positions $\vec{x}_1 \ldots \vec{x}_{p+1}$ recursively defined by $$\vec{x}_1 \vec{0} \tag{19}$$

$$\vec{x}_{i+1} = \vec{x}_i + \vec{\Delta}_{ti} \tag{20}$$

where $\vec{x}_{p+1}$ is introduced for convenience, and a composite image Q defined by $$Q_\pi = \bigcup_{i=1}^{P} Q_{ti}[\vec{x}_i] \tag{21}$$

For a path $\pi$ we will define $$\vec{\Delta}_\pi = \vec{x}_{p+1} = \sum_{i=1}^{P} \vec{\Delta}_{ti} \tag{22}$$

to be the displacement of the path. By analogy with (13) we will require our sources to be designed so that $$Q_{ti}[\vec{x}_i] \cap Q_{tj}[\vec{x}_j] = \phi \tag{23}$$

for $i \neq j$, for every path $\pi$. The importance of this requirement will be clear shortly. A Markov source is said to be unifilar if the messages and images associated with distinct paths are distinct. In that case, $$P_r\{M_\pi\} = P_r\{Q_\pi\} = P_r\{\pi\} \tag{24}$$

Note that unifilar sources are 1-to-1 in the sense of (5). For simplicity, we will assume that our image sources are designed to be unifilar.

SYMBOL TEMPLATES

The imaging model defined by (21) has a simple interpretation. Imagine a collection of transparent plastic sheets, on each of which is painted one copy of some template Q, with the origin of Q at the center of the sheet. For each transition $t_i$ of path $\pi$, a sheet containing $Q_{ti}$ is placed on top of a stack of transparencies with the center of the sheet aligned at $\vec{x}_i$. The complete stack of transparencies defines $Q_\pi$. Note that the individual painted sheets are likely to overlap significantly. It is also permissible for the template bounding boxes to overlap; bounding boxes play no particular role in our imaging model. However, by (23), the painted regions on the sheets are required to be disjoint.

The image source defines a relation between message strings and images via an underlying path and (16) and (21). While our primary concern is recovering messages from observed images, a source model may also be used to generate an image of a specified message. As noted above, an image model defines a finite-state acceptor for the language of messages generated by the model. Thus, given a message string M, there are well-known procedures to determine if there is a complete path $\pi$ for which $M_\pi = M$, and, if such a path exists, to find one. The image $Q_\pi$ defined by (21) is then an image of M. Using image models for synthesis can be an effective approach to designing a source model for some class of images, for use in decoding.

CHANEL MODEL

The purpose of channel modeling is to derive an expression for $L(Z/Q_M)$ for use in (9). We explain this in Appendices B and C.

DECODER

Now, suppose we are given an image source and some observed image Z. By the discussion in Appendix A leading to (9), MAP decoding of Z is equivalent to finding a complete path $\pi$ through the source which maximizes $$L(M_\pi, Z) = L(Z|Q_{M\pi}) + \log P_r\{Q_{M\pi}\} \tag{30}$$

subject to the constraint $\vec{x}'_{p+1} = [W\ H]$. If we assume the source is a unifilar Markov source which satisfies (5) then using (17)

$$\log P_r\{Q_{m\pi}\} = \log P_r\{M_\pi\} \tag{31}$$

$$= \log P_r\{\pi\} \tag{32}$$

$$= \sum_{i=1}^{P} \log a_{ti} + \log P_{rti}$$

Substituting (33) and (29) into (30), we find $$L(M_\pi, Z) = \sum_{i=1}^{P} [L(Z|Q_{ti}[\vec{x}_i]) + \log a_{ti}] \tag{34}$$

Figure 8:
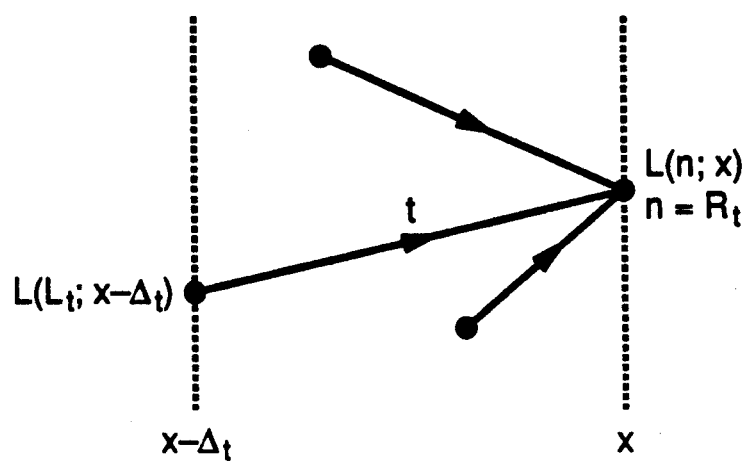
FIG. 8 is a schematic illustration of decoder recursion.

Our approach to finding a path which maximizes the right-hand side of (34) is patterned after the use of the well-known Viterbi algorithm in speech recognition using hidden Markov models (HMMs) (X. Huang, Y. Ariki, and M. Jack, Hidden Markov Models for Speech Recognition, 1990, Edinburgh: Edinburgh University Press). By direct analogy to the speech case, Z can be decoded by computing the recursively-defined function $$L(n;\vec{x}) = \max_{t|R_t = n} \{L(L_t;\vec{x} - \vec{\Delta}_t) + \log a_t + L(Z|Q_t[\vec{x} - \vec{\Delta}_t])\} \tag{35}$$

for each $(n,\vec{x}) \in N \times \Omega$, as illustrated in FIG. 8. During the recursion, backpointers are stored, as appropriate, to allow the corresponding best path to be recovered.

DECODER SCHEDULE

The computation of (35) requires a specification of the order in which the elements of $N \times \Omega$ are visited. Such an order specification is called a schedule for the recursion. A valid schedule must satisfy the constraint that $L(n;\vec{x})$ may be computed only after the computation of each $L(L_t;\vec{x} - \vec{\Delta}t)$ which appears on the right hand side of (35). In the case of speech HMMs, the index set $\Omega$ is a 1-dimensional interval $[0,T]$ and $\vec{\Delta}_t \in \{0,1\}$ is a non-negative scalar, where a transition with $\vec{\Delta} = 0$ is called a null transition. If an HMM contains no closed loops of null transitions, then its nodes may be ordered so that the scheduling constraints are satisfied when the elements of $\Omega$ are visited in the order $0, 1, \ldots, T$. Furthermore, testing an HMM for closed loops of null transitions and sorting the nodes are straightforward procedures. Scheduling (35) when $\Omega$ is multi-dimensional and the components of $\vec{\Delta}$ are unconstrained in sign, as they are in an image source model, is significantly more complicated than scheduling an HMM. We develop an approach to this problem based on the known general theory of linear schedules for regular iterative algorithms (S. Rao, Regular Iterative Algorithms and Their Implementations on Processor Arrays, PhD thesis, Stanford University, Oct. 1985; R. Karp, R. Miller and S. Winograd, "The organization of computations for uniform recurrence equations", Journal of the ACM, vol. 14, pp. 563–590, 1967).

A decoding schedule is a set of non-negative, integer-valued functions $\{S_n(\vec{x}) \mid n \in N\}$ and image point $\vec{x} \in \Omega$ the "time" at which $L(n;\vec{x})$ is computed using (35). To be consistent with the data dependencies in (35) a valid schedule must satisfy the constraint that, for each transition $t \in T$ $$S_{R_t}(\vec{x}) \geq S_{L_t}(\vec{x} - \vec{\Delta}_t) + 1 \tag{36}$$

for each $\vec{x} \in \Omega$. To impose exploitable structure on the scheduling problem it is usual to constrain the scheduling functions to be affine transformations, so that $$S_n(\vec{x}) = \Lambda'_n \vec{x} + \gamma_n \tag{37}$$

where $$\Lambda_n = \begin{bmatrix} \lambda_n^x \\ \lambda_n^y \end{bmatrix} \tag{38}$$

and $\gamma_n \geq 0$. The components of $\Lambda_n$ are unconstrained in sign. A schedule of the form (37) is called a linear schedule. A fundamental result of linear scheduling theory is that it is possible to find a linear schedule which satisfies (36) if and only if there is no loop $\pi$ for which $\vec{\Delta}_\pi = 0$. For this reason, a graph which contains no loop with zero(vector) total displacement is said to be computable. We will impose a somewhat stronger constraint on the form of a schedule, motivated by the desired to decode images in a row-wise fashion, from top to bottom. A row-major linear schedule is a linear schedule in which $$\Lambda_n = \begin{bmatrix} \pm \lambda_x \\ \lambda_y \end{bmatrix} \tag{39}$$

where $\lambda_x \geq 0$, $\lambda_y > 0$ and $$\lambda_y \geq \lambda_x W \tag{40}$$

The effect of (40) is to require, for each node n, that $L(n;\vec{x})$ be computed for each pixel of row i of an image before it is computed for any pixel of row i+1. Note however, that the row-major constraint does not impose any ordering on the computations of $L(n_1;\vec{x})$ and $L(n_2;\vec{x})$ if $n_1$ and $n_2$ are different nodes. Thus, for example, $L(n_1;\vec{x})$ for row i may be computed after $L(n_2;\vec{x})$ for row i+1.

In Appendix D we show that a row-major linear schedule may be found for a computable image decoder if there is no loop $\pi$ for which $\Delta y_\pi < 0$. We do this by presenting a simple construction for a specialized form of row-major schedule. A strongly row-major schedule is a row major schedule in which $S_n(\vec{x}) = S_n(x,y)$ has one of two forms, depending on n; either $$S_n(x,y) = KWMy + p_nWM + Mx + \gamma_n \quad (41)$$

or $$S_n(x,y) = KWMy + p_nWM + M(W-1-x) + \gamma_n \quad (42)$$

where M is the number of nodes in N, K is a positive constant, and $$0 \leq p_n < K \quad (43)$$

$$0 \leq x < W \quad (44)$$

$$0 \leq \gamma_n < M \quad (45)$$

where $P_{n1} = P_{n2}$ only if $S_{n1}(x,y)$ and $S_{n2}(x,y)$ have the same form.

Because of (43)-(45), a strongly row-major schedule has a simple interpretation as a 4-level nested iteration for computing the values of $L(n;\vec{x})$. The levels of the iteration correspond, respectively, to the 4 terms on the right hand side of (41) or (42).

Figure 30:
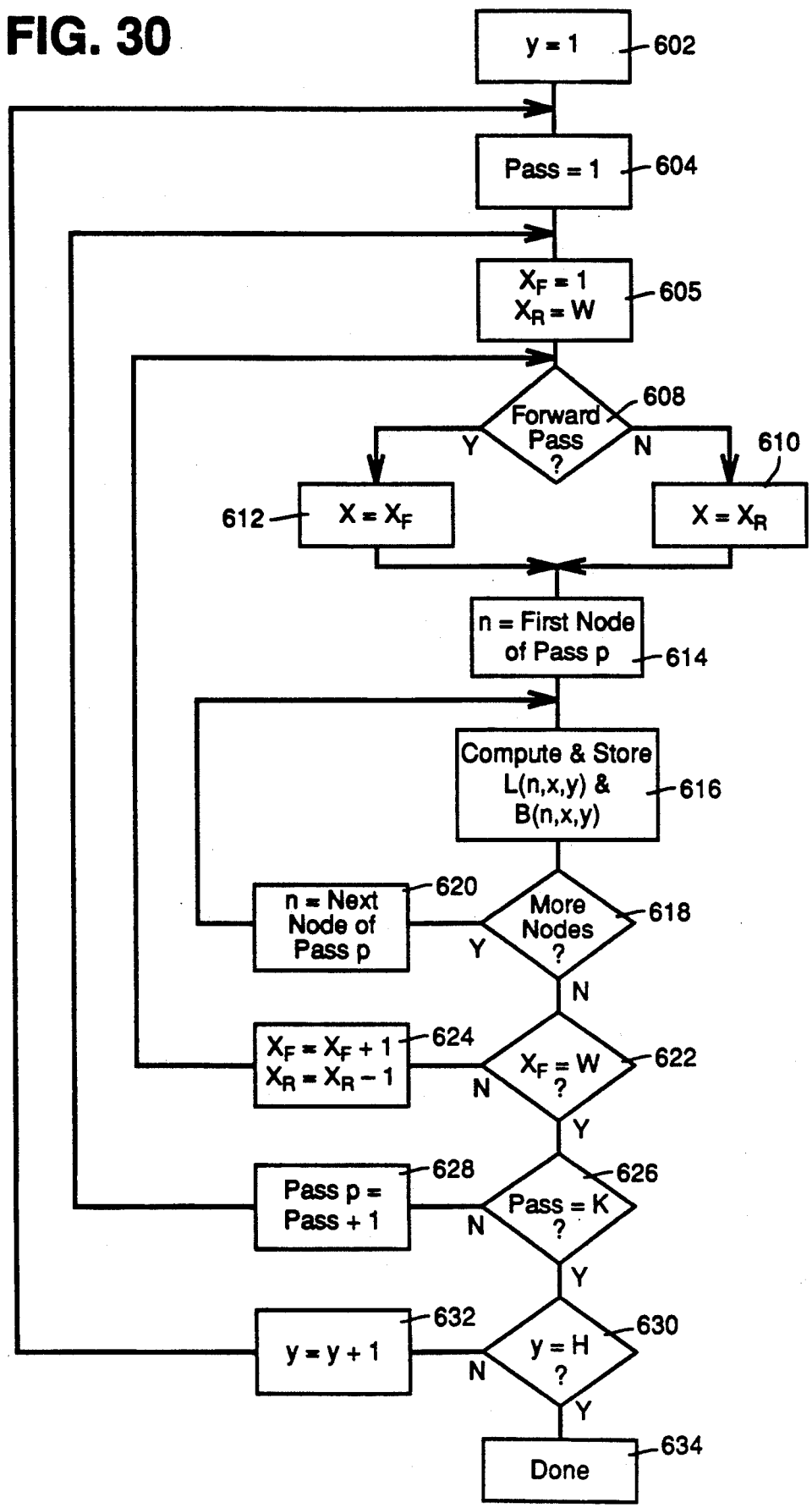
FIG. 30 is the flow chart of an example of one form of algorithm that the node score and backpointer processor of FIG. 29 can use in carrying out the invention.

As shown in FIG. 30 and explained in more detail later, the outermost level iterates over y, computing $L(n;\vec{x})$ for each n and $\vec{x}$ of a given row before proceeding to the next row. That the outermost level proceeds row-wise reflects the fact that $$S_{n1}(x_1, y+1) > S_{n2}(x_2, y) \quad (46)$$

for every $n_1, n_2, x_1, x_2$. The second level (fixed y) iterates over a sequence of K "passes" indexed by $p_n$. A pass corresponds to a subset of the nodes in N. If $p_{n1} < p_{n2}$ then the pass containing $n_1$ occurs before the pass for $n_2$, since $$S_{n1}(x_1, y) < S_{n2}(x_2, y) \quad (47)$$

for every $x_1, x_2$. The third level (i.e. fixed y and $p_n$) iterates over x. If $p_n$ corresponds to a pass for which $S_n(x,y)$ has the form (41) this iteration proceeds in order of increasing x (left-to-right). On the other hand, if $S_n(x,y)$ has the form (42) the iteration proceeds right-to-left. Finally, the innermost level of the iteration (fixed y, $p_n$ and x) evaluates $L(n;\vec{x})$ for the nodes of the pass in order of increasing $\gamma_n$.

FONT METRICS

Each transition of a Markov source is labelled with a template Q and a displacement $\vec{\Delta}$. In addition, correct template alignment during decoding and imaging requires knowledge of the character sidebearings $\lambda$ and $\rho$ and the character baseline $\mu$. In some situations, the templates and metric parameters may be obtained from known font tables. However, even when font metric tables are available, the values they contain may not be adequate, particularly for outline fonts imaged at small sizes on low resolution devices. Outline font metrics are typically given for a standard font size, with values for other sizes derived by scaling. Character set widths typically scale linearly with character size and may be accurately predicted from font tables. However, because font interpreters often use "hints" to adjust glyph dimensions such as stem widths and overshoot, the sidebearings and baseline of a character image may deviate from values extrapolated from the tables.

To avoid these possible problems, a procedure for estimating character metrics from designed sample text images such as that in FIG. 14 has been developed by us. The inputs to the procedure are an image containing text in some font and a transcription of the text. The outputs of the procedure are a bitmap template and font metric values (sidebearings, baseline depth and set width) for each character. This font metric estimation procedure estimates the left and right sidebearings $\lambda$ and $\rho$, the set width $\Delta x$, and the depth below baseline $\mu$ for each character of a font, as defined in FIG. 3. Since the inputs to the procedures are an image containing sample text and a transcription of the text, the identities of the glyphs are known. It is assumed that the text image can be analyzed to obtain the coordinates of the glyph bounding boxes and the intercharacter spacings d. Note that $\lambda$, $\rho$, $\Delta x$ and $\mu$ cannot be measured directly without information about the locations of the glyph origins. The absence of such information is the source of the font metric estimation problem. We describe below separately the procedures for estimating sidebearing and baseline parameters.

The form of (11) suggests that the sidebearings can be determined by solving a set of linear equations, consisting of one equation for each pair of adjacent glyphs in the sample image. The problem with this suggestion is that the sidebearing equations may be overdetermined if the text image includes more than one sample of a given character pair. The observed interglyph spacing for a given character pair may vary as a result of printing or scanning distortions. As a result, the same right and left sidebearing variables may appear in two or more equations (11), with different values of d. The standard approach to handling overdetermined equations of this type is to reformulate the estimation problem as one of least squares parameter optimization (W. H. Press, B. P. Flannery, S. A. Teukolsky, and W. T. Vetterling, Numerical Recipes in C, 1988, Cambridge: Cambridge University Press). This forms the basis for our estimation procedure.

LEAST SQUARES ESTIMATION PROCEDURE

Let $C_k$, $k = 1 \ldots K$ be a set of characters, with left and right sidebearings $\lambda_k$ and $\rho_k$, respectively. Let $P_i$, $i = 1 \ldots M$, denote the $i^{th}$ pair of glyphs in a sample image of text, where the left and right glyphs of the pair are images of characters $C_{li}$ and $C_{ri}$, respectively. While the term "character" is normally taken in its ordinary sense, the character labels associated with the glyphs may be any type of label. For example, the glyphs of an image might be partitioned into disjoint clusters based on similarity of shape or other properties. A unique identifier might then be assigned to each cluster as used as the "character" labels in the estimation procedure. For each $P_i$, the left and right sidebearings of $C_{ri}$ and $C_{li}$ are relted to the interglyph spacing $d_i$ by $$\rho_{li} + \lambda_{ri} = d_i + \epsilon_i \quad (86)$$

where $\epsilon_i$ is a random variable which accounts for the effects of noise and distortion. The total squared sidebearings estimation error is $$E_S = \sum_{i=1}^{M} \epsilon_i^2 = \sum_{i=1}^{M} [\rho_{li} + \lambda_{ri} - d_i]^2 \quad (87)$$

and the least squares estimates of $\rho_k$ and $\lambda_k$, denoted $\pi_k$ and $\lambda_k$, are those values which jointly minimize $E_S$. The sidebearing error will be minimized when $$\left.\frac{\partial E_S}{\partial \rho_K}\right|_{\rho_i=\hat{\rho}_i,\lambda_j=\hat{\lambda}_j} = 0 \text{ and} \tag{88}$$

$$\left.\frac{\partial E_S}{\partial \lambda_K}\right|_{\rho_i=\hat{\rho}_i,\lambda_j=\hat{\lambda}_j} = 0, \tag{89}$$

Condition (88) implies that $$\sum_{i=1}^{M} \hat{\rho}_{l_i} \delta_{l_i,k} + \sum_{i=1}^{M} \hat{\lambda}_{r_i} \delta_{l_i,k} = \sum_{i=1}^{M} d_i \delta_{l_i,k} \tag{90}$$

where $\delta_{i,j}$ is the Kronecker delta function. The first term in (90) may be written $$\sum_{i=1}^{M} \hat{\rho}_{l_i} \delta_{l_i,k} = \hat{\rho}_k M_{k,*} \text{ where} \tag{91}$$

$$M_{k,*} = \sum_{i=1}^{M} \delta_{l_i,k} \tag{92}$$

is the number of glyph pairs whose left member is ian instance of $C_k$. Similarly, $$\sum_{i=1}^{M} \hat{\lambda}_{r_i} \delta_{l_i,k} = \sum_{j=1}^{K} \hat{\lambda}_j M_{k,j} \tag{93}$$

where $$M_{k,j} = \sum_{i=1}^{M} \delta_{l_i,k} \delta_{r_i,j} \tag{94}$$

is the number of glyph pairs whose left and right members are instances of and $C_k$ and $C_j$, respectively. Finally, $$\sum_{i=1}^{M} d_i \delta_{l_i,k} = \sum_{i=1}^{M_{k,*}} d_i^{(k,*)} \tag{95}$$

where $d_i^{(k,*)}$ is the interglyph spacing for the $i^{th}$ pair whose left character is $C_k$. Substituing (91), (93), and (95) into (90) and dividing by $M_{k,*}$ gives $$\hat{\rho}_k + \sum_{j=1}^{K} \hat{\lambda}_j \frac{M_{k,j}}{M_{k,*}} = \frac{1}{M_{k,*}} \sum_{i=1}^{M_{k,*}} d_i^{(k,*)} \tag{96}$$

for $k=1 \ldots K$.

The right hand side of (96) may be interpreted as an estimate of the mean interglyph space conditioned on the character code of the left glyph, so that $$\frac{1}{M_{k,*}} \sum_{i=1}^{M_{k,*}} d_i^{(k,*)} = E\{d|C_l = k\} \tag{97}$$

where E is the expectation operator. Similarly, $$\frac{M_{k,j}}{M_{k,*}} = P_r\{C_r = j | C_l = k\} \tag{98}$$

so that (96) may be written $$\hat{\rho}_k = \sum_{j=1}^{K} \hat{\lambda}_j P_r\{C_r = j|C_l = k\} = E\{d|C_l = k\} \tag{99}$$

for $k=1 \ldots K$. A similar derivation starting from (89) leads to the condition $$\hat{\lambda}_k = \sum_{j=1}^{K} \hat{\rho}_j P_r\{C_l = j|C_r = k\} = E\{d|C_r = k\} \tag{100}$$

for $k=1 \ldots K$. In keeping with the usual terminology of least squares estimation, equations (99) and (100) will be referred to as the sidebearing normal equations. These may be put into matrix form as $$\left[\begin{array}{c|ccc} & a_{11} & \ldots & a_{1K} \\ I_k & \vdots & & \vdots \\ & a_{K1} & \ldots & a_{KK} \\ \hline b_1 \ldots b_{1K} & & I_K & \\ \vdots & & & \\ b_{K1} \ldots b_{KK} & & & \end{array}\right] \tag{101}$$

$$\begin{pmatrix} \hat{\rho}_1 \\ \vdots \\ \hat{\rho}_K \\ \hat{\lambda}_1 \\ \vdots \\ \hat{\lambda}_K \end{pmatrix} = \begin{pmatrix} E\{d|C_l = 1\} \\ \vdots \\ E\{d|C_l = K\} \\ E\{d|C_r = 1\} \\ \vdots \\ E\{d|C_r = K\} \end{pmatrix}$$

where $$a_{ij} = P_r\{C_r = j | C_l = i\} \tag{102}$$

$$b_{ij} = P_r\{C_l = j | C_r = i\} \tag{103}$$

and $I_k$ is the $K \times K$ identity matrix.

A minor problem arises because the sidebearing normal equations are inherently underdetermined. Intuitively, because only pairwise sums of left and right sidebearings are directly observable via (86), a constant may be added to each right sidebearing and subtracted from each left sidebearing without affecting the observed interglyph spacings. This ambiguity may be formally demonstrated by noting that if $\hat{\rho}_i$ and $\hat{\lambda}_i$ satisfy (101), then so do $\hat{\rho}_i + \gamma$ and $\hat{\lambda}_i - \gamma$ for any $\gamma$ since $$\sum_{j=1}^{K} a_{ij} = \sum_{j=1}^{K} b_{ij} = 1 \tag{104}$$

for $i=1 \ldots K$. A simple way to resolve the ambiguity is to choose $\hat{\rho}_1 = 0$. In that case, the remaining $2K-1$ sidebearings may be determined by solving the reduced set of linear equations which results from deleting the first row and first column of the $2K \times 2K$ coefficient matrix and the first rows of the $2K \times 1$ column vectors of (101). After the normal equations are solved, the estimated sidebearings may be adjusted by adding and subtracting any constant. For example, the left and right sidebearings of 'O' may be made equal, to reflect a common typographic practice.

The sidebearing normal equations may possess additional degrees of freedom depending on the statistics of the text sample used for estimation. Obviously, it will be impossible to estimate some left (right) sidebearing in an instance where the corresponding character does not occur as the right (left) member of a glyph pair in the image. A more subtle form of indeterminacy arises if the text image does not include samples of a sufficient number of distinct character pairs. An equation of the form (86) may be viewed as asserting a binary relation between the sidebearing variables $\rho_{li}$ and $\lambda_{ri}$. The transitive closure of that relation, across all glyph pairs, partitions the set of sidebearings into equivalence classes of mutually dependent variables. Each equivalence class corresponds to a subset of the complete set of sidebearing equations which may be independently solved. Each subset has one degree of freedom, with the result that one sidebearing in each equivalence class may be arbitrarily set, as noted above. The above observation suggests that the sidebearing variables should be partitioned into independent groups of mutually dependent variables and the normal equations solved for each group separately. Note that it is the sidebearing variables, not the characters, which are partitioned. It is thus possible for the left and right sidebearings of a character to belong to different sidebearing groups. This implies that some caution is required when using the estimated sidebearings for glyph positioning. For example, unless the left and right sidebearings of a character belong to the same sidebearing group, it is not correct to add them to estimate the set width of the character using (10). Similarly, only sidebearings from the same group may be added to compute interglyph spacing using (11). Font sample images such as that in FIG. 14 should be designed to avoid this problem by insuring that all sidebearing variables belong to the same group.

Character baseline depth estimation is based on the model of character vertical alignment shown in FIG. 13, which is a slight generalization of the typographic model in FIG. 3. A page of text consists of a set of parallel lines of text. In order to accommodate the possibility of skew during scanning, each text line is assumed to be oriented at an unknown angle $\theta$ with respect to the horizontal, where $\theta$ may vary from line to line. Thus, the baseline of each text line is described by a linear equation of the form $$y = \alpha x + \beta \tag{105}$$

where $$\alpha = \tan \theta \tag{106}$$

The glyphs of each line are positioned along the line according to the model given in FIG. 3, when the character coordinate system is rotated by $\theta$. The glyph bounding box is the smallest rectangle, oriented with the image coordinate axes, which just encloses the glyph. If the image is skewed, the glyph bounding box will be different than the character bounding box defined in FIG. 3 since the latter is oriented with the (rotated) character coordinate system. The glyph origin is the lower left corner of the glyph bounding box and the glyph coordinates are the x and y coordinates of the glyph origin. The glyph coordinates and line baseline are related by $$y = \alpha x + \beta + \mu \tag{107}$$

where $\mu$ is the depth below baseline of the (rotated) character. Note that $\mu > 0$ for characters which extend below the baseline if the positive y direction is down. The objective of baseline estimation is to determine $\alpha$ and $\beta$ for each line and $\mu$ for each character of a sample text image, given a set of glyph coordinates.

Suppose the sample image contains glyphs $G_i$, $i = 1 \ldots N$, where $G_i$ is an instance of the character $C_{ci}$. The glyphs are organized into lines of text $L_i$, $i = 1 \ldots L$, where $G_i$ belongs to line $L_{li}$. The measurable coordinates of $G_i$ are related to the underlying character and line parameters by $$\alpha_{li} x_i + \beta_{li} + \mu_{ci} = y_i + \epsilon_i \tag{108}$$

where $\epsilon$ is a noise term. The total squared baseline estimation error is $$E_B = \sum_{i=1}^{N} \epsilon_i^2 = \sum_{i=1}^{N} [\alpha_{li} x_i + \beta_{li} \mu_{ci} - y_i]^2 \tag{109}$$

and the least square estimates $\hat{\alpha}_k$ $\hat{\beta}_k$ and $\hat{\mu}_k$ are those values which jointly satisfy $$\left. \frac{\partial E_B}{\partial \beta_k} \right|_{\alpha_r = \alpha_r, \beta_i = \beta_i, \mu_j = \mu_j} = 0 \tag{110}$$

$$\left. \frac{\partial E_B}{\partial \mu_k} \right|_{\alpha_r = \alpha_r, \beta_i = \beta_i, \mu_j = \mu_j} = 0 \tag{111}$$

and $$\left. \frac{\partial E_B}{\partial \alpha_k} \right|_{\alpha_r = \alpha_r, \beta_i = \beta_i, \mu_j = \mu_j} = 0 \tag{112}$$

Condition (110) implies the relation $$\beta_k + \sum_{j=1}^{K} \beta_j P_r\{C = j | L = k\} + \alpha_k E\{x | L = k\} = E\{y | L = k\} \tag{113}$$

through a derivation similar to that used to obtain (99) from (88) in section 5.1. Similarly, (111) leads to $$\beta_k + \sum_{j=1}^{L} \beta_j P_r\{L = j | C = k\} + \tag{114}$$

$$\sum_{j=1}^{L} \alpha_j E\{x | C = k, L = j\} P_r\{L = j | C = k\} = E\{y | C = k\}$$

after a derivation similar to that used to obtain (100) from (89). Finally, (112) implies that $$\hat{\beta}_k E\{x | L = k\} + \sum_{j=1}^{K} \hat{\mu}_j E\{x | C = j, \tag{115}$$

$$L = k\} P_r\{C = j | L = k\} + \hat{\alpha}_k E\{x^2 | L = k\} = E\{xy | L = k\}$$

Conditions (113), (114), and (115), which are collectively termed the baseline normal equations, may be put into matrix form $$\begin{bmatrix} \begin{bmatrix} q_1 \ldots 0 \\ \cdot \\ \cdot \\ 0 \ldots q_L \end{bmatrix} & \begin{bmatrix} u_{11}w_{11} \ldots u_{K1}w_{1k} \\ \cdot \\ \cdot \\ u_{1L}w_{L1} \ldots u_{KL}w_{LK} \end{bmatrix} & \begin{bmatrix} v_1 \ldots 0 \\ \cdot \\ 0 \cdot 0 \\ 0 \cdot v_L \end{bmatrix} \\ \begin{bmatrix} u_{11}r_{11} \ldots u_{1L}r_{1L} \\ \cdot \\ \cdot \\ u_{K1}r_{k1} \ldots u_{kL}r_{KL} \end{bmatrix} & I_K & \begin{bmatrix} r_{11} \ldots r_{1L} \\ \cdot \\ \cdot \\ r_{K1} \ldots r_{KL} \end{bmatrix} \\ \begin{bmatrix} v_1 \ldots 0 \\ 0 \cdot 0 \\ 0 \ldots v_L \end{bmatrix} & \begin{bmatrix} w_{11} \ldots w_{1K} \\ \cdot \\ w_{L1} \ldots w_{LK} \end{bmatrix} & I_L \end{bmatrix} \cdot \begin{pmatrix} \hat{\alpha}_1 \\ \cdot \\ \hat{\alpha}_L \\ \hat{\mu}_1 \\ \cdot \\ \hat{\mu}_K \\ \hat{\beta}_1 \\ \cdot \\ \hat{\beta}_L \end{pmatrix} = \begin{pmatrix} E\{xy|L=1\} \\ \cdot \\ E\{xy|C+K\} \\ E\{y|L=1\} \\ \cdot \\ E\{y|C=K\} \\ E\{y|L=1\} \\ \cdot \\ E\{y|L=L\} \end{pmatrix} \quad (116)$$

where $$q_i = E\{x^2|L=i\} \quad (117)$$

$$r_{ij} = P_r\{L=j|C=i\} \quad (118)$$

$$W_{ij} = P_r\{C=j|L=i\} \quad (119)$$

$$u_{ij} = E\{x|C=i,L=j\} \quad (120)$$

$$v_i = E\{x|L=i\} \quad (121)$$

The above derivation allows the slope of each line to be different. Similar equations result if it is assumed the lines are partitioned into groups, where the lines in each group have the same slope but different groups may have different slopes. An extreme example of this is when a global skew is assumed for all lines on a given page. The baseline normal equations possess an inherent singularity because only the sum of $\beta$ and $\mu$ is observable via (108). As was the case for sidebearings, the baseline variables $\beta_i$ and $\mu_i$ may be partitioned into equivalence classes and one variable in each group arbitrarily set. For example, one reasonable choice is to fix the depth of 'M' to be zero.

ILLUSTRATIVE EXAMPLES

Based on our model of the image source as described above, including our novel procedures for estimating character metrics from sample text images, we have in a straightforward manner created a document image generator in the form of a composite Markov source (stochastic finite-state automaton) which combines a message source with an imager. The message source produces a string of symbols, or text, which contains the information to be transmitted. The imager is modeled as a finite-state transducer which converts the message into an ideal bitmap. The decoder estimates the message, given the observed image, by finding the a posteriori most probable path through the combined source and channel models using a Viterbi-like dynamic programming algorithm. The finite state networks used in the imager, as well as those used in the decoder, are straightforward networks whose construction will be apparent to those skilled in this art from the foregoing description. FIG. 5 is a sample of one such simple finite state network. A system according to the invention as described above has been built, and source models and recognition results are presented for four types of images: 1) simple text columns, 2) text in a connected, scriptlike font, 3) dictionary entries (in which the logical components of each entry are identified), 4) high-density printed digital data. Except where noted, the text images were generated by applying a bit-flip noise model with known parameters to synthetic images created using a PostScript interpreter at an assumed resolution of 300 dpi. The font sample images used for estimating font metrics, were created in the same way, using the known font and character size of the test text. All text line baselines were perfectly horizontal and the bitmaps of all instances of a given character were identical in the clean images.

TEXT TRANSCRIPTION

Text transcription is concerned with decoding images to extract simple text strings of the sort illustrated in FIG. 2(a). FIG. 12(a) shows a sample text column in Adobe Times Roman 12 pt. The noisy image in FIG. 12(b) was formed by randomly inverting 10 percent of the black and 49 percent of the white pixels in the original image (i.e. $\pi_0=0.51$ and $\pi_1=0.9$ in the bit-flip model). The noisy image in FIG. 12(b) was decoded using the text column finite state network in FIG. 5 with a 70 character subset of the full Times Roman font consisting of the upper and lower case alphabet, the digits, and the 8 punctuation symbols in the string "!;,.:?[]". The transition probability of each character branch in the text-line subnetwork was set equal to 1/70. The decoded message is shown in FIG. 15. The transcription is error-free except that the '-' in end-user is missing because the grammar did not contain that symbol.

FIGS. 16 and 17 repeat the previous example for Mistral, a script-like font in which the characters in a word are connected. FIG. 16(a) is the original image in 12 pt text, and FIG. 16(b) is the degraded image to simulate the noisy channel. The transcription in FIG. 16 contains several case in which 'r' is misrecognized as 's' (e.g. architectures). Inspection of the clean bitmaps indicates that 'r' and 's' are very similar in Mistral, so this error is not surprising. Such errors might be eliminated by using a more constrained set of networks (e.g. word lexicon) than the simple set shown in FIG. 5.

FIG. 18 shows the results of two preliminary experiments involving scanned images. The synthetic text image in FIG. 13(a) and the Times Roman font sample image in FIG. 15 were printed and then scanned at 300 dpi. The pages were carefully aligned during scanning to minimize skew. The scanned images were skew corrected by estimating the baseline of each text line using the least squares estimation procedure as described above and then vertically shifting each character to a horizontal baseline. A single example of each character was drawn from the font sample image to serve as the character template. The parameters of the bit-flip noise model were manually adjusted until good decoding accuracy was achieved; the results in FIG. 18 are for 10% flip of both white and black.

FIG. 18(a) shows the result of decoding the scanned image using the scanned font sample. No errors occurred except for the missing '-'. FIG. 18(b) shows the result of modifying the character models by making the set widths equal to the bounding box widths of the templates and setting all sidebearings to zero. There are several cases in which 'j' is misrecognized, reflecting the fact that the modified metrics do not allow 'j' to extend into the bounding box of the preceding character. Less expected are several errors in which 'l' is misrecognized as 'I'. Inspection of the scanned character templates reveals that the extracted templates for 'l' and 'I' are very similar. However, the estimated set widths are significantly different, which appears to impose a spacing constraint which allows correct classification in FIG. 18(a).

LOGICAL STRUCTURE ANALYSIS

Figure 20:
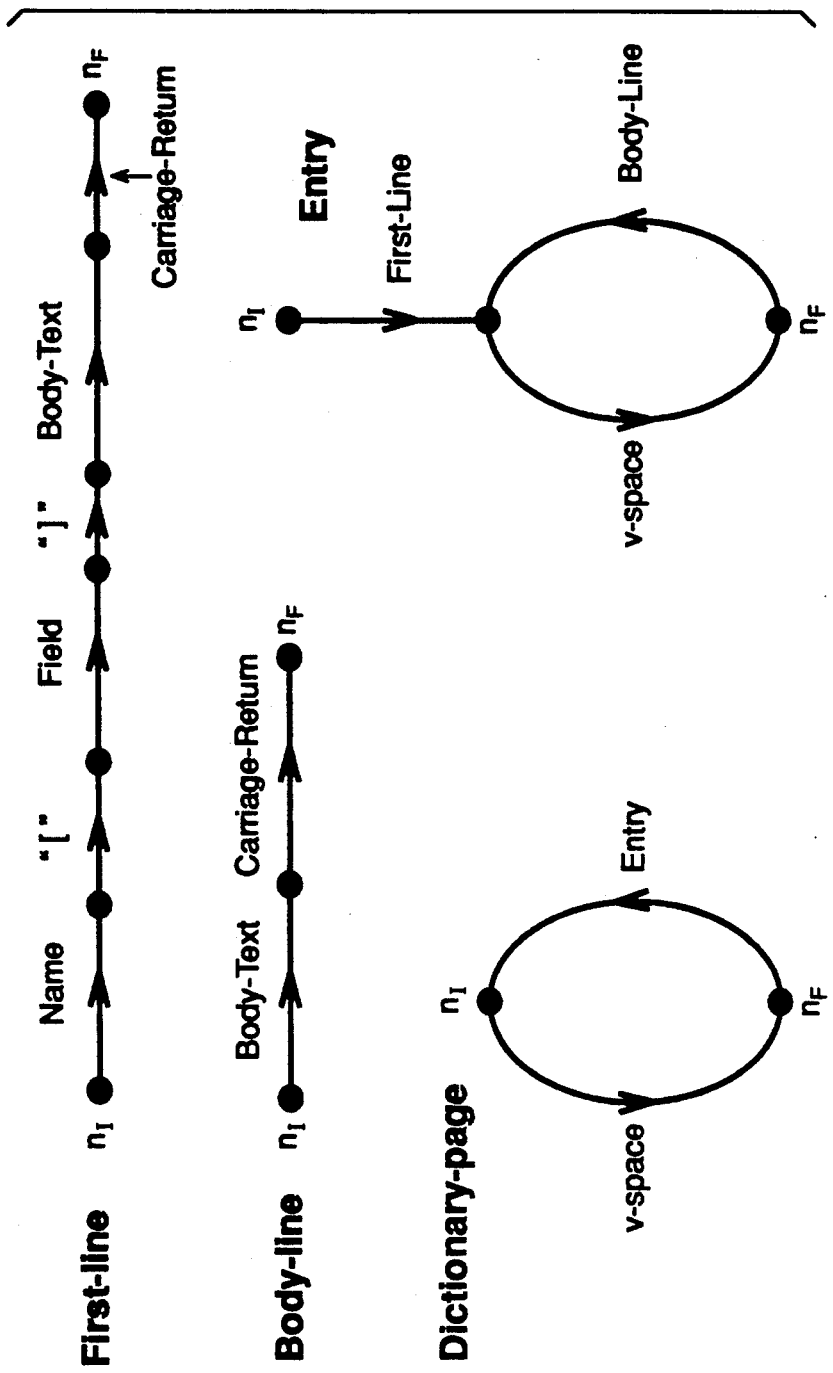
FIG. 20 shows the grammar used in accordance with the invention to decode the noisy image of FIG. 19(b) and FIG. 21 the resultant output.

Logical structure analysis is concerned with decoding images to extract message strings of the sort illustrated in FIG. 2(b). Such messages include annotations and tags which identify logical function of document components but are not directly manifested as glyphs in the image. FIG. 19 shows clean and noisy images of a simple dictionary-like page modeled after a commercial dictionary of scientific and technical terms (Dictionary of Scientific and Technical Terms, second edition, McGraw-Hill). The finite state network used for the dictionary page is shown in FIG. 20. In the vertical direction, a dictionary page is an alternating sequence of entry and v-space components. An entry, in turn, contains a first-line followed by zero or more body-lines. Horizontally, the first-line is composed of name, field and body-text fields terminated by a carriage-return. The fields of the first line are distinguished in the image by the use of different fonts and the "boilerplate" brackets around the Field.

Not indicated in FIG. 20 is the markup to be included in the output decoded message. This is illustrated in FIG. 21, which shows the decoding of the image in FIG. 19(b). Each entry, as well as the individual entry components, are indicated using LATEX-like notation. The markup annotations (e.g. name{) are attached as message strings to various null transitions of the dictionary page networks.

PRINTED DIGITAL DATA

Figure 22:
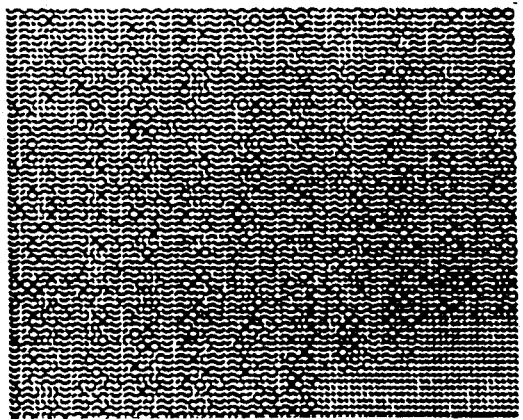
Figure 22:
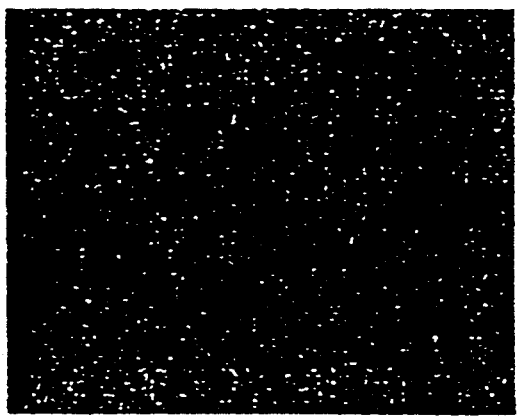

The final example is decoding of high-density printed digital data. FIG. 22(a) shows a block of 5120 bits of data encoded using a diagonal glyph in a in 7 pixel square cell for each bit. The data is organized into segments of 256 bits, consisting of 16 rows of 16 bits each. The bits within a segment are sequenced in row-major order. The block itself consists of 4 rows of 5 segments each, also in row-major order. The noisy version is shown in FIG. 22(b).

A simple finite state network for printed data blocks is given in FIG. 23. This network does not capture the overall bit ordering of the data block, but instead generates a simple row-wise decoding. A postprocessor is then used to unscramble the bits into the correct order. As indicated, each decoded row is constrained to contain a multiple of 8 bits. Compared with a less constrained grammar, this reduces the number of bit insertion and deletion errors and thus improves the overall accuracy.

FIG. 24 shows the result of decoding the image in FIG. 22(b) using the network in FIG. 23, unscrambling the bits and interpreting the resulting data stream as a sequence of 8 bit ascii characters. The decoded message contains several misrecognized characters, each of which corresponds to a single-bit error in a data byte.

There will now be described in detail one way, which is not intended to be limiting, for implementing the system of the invention using concepts associated with finite-state image generators of the stochastic type well established in this and the related field of speech processing.

Figure 25:
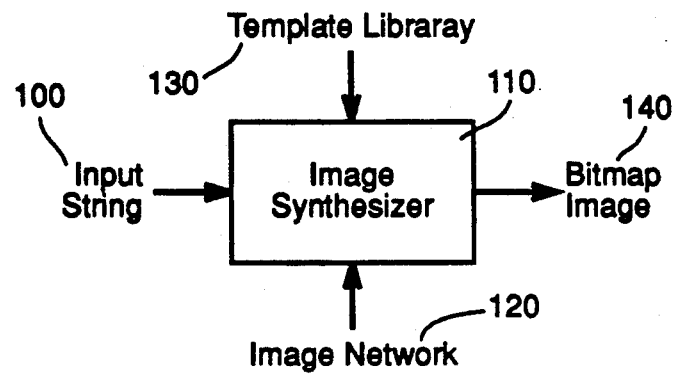
FIG. 25 is a block diagram of one form of image synthesizer in accordance with the invention.

FIG. 25 shows the use of the invention for image synthesis. An image synthesizer 110 (a.k.a. imager) takes as inputs a description of a class of images expressed as an image network 120, a library of image templates 130 each listing the parameters of a typographic model of a particular character as indicated in FIG. 3, and a character string 100 which is used to specify some particular image from the class described by the image network. The output of the imager 110 is a bitmap image 140 formed by arranging a set of constituent images drawn from the template library 130. This is analogous to the stack of transparencies previously used to explain the imaging process. The identities and spatial positions of the constituent images are determined jointly by the input string 100 and the image network 120.

Figure 26:
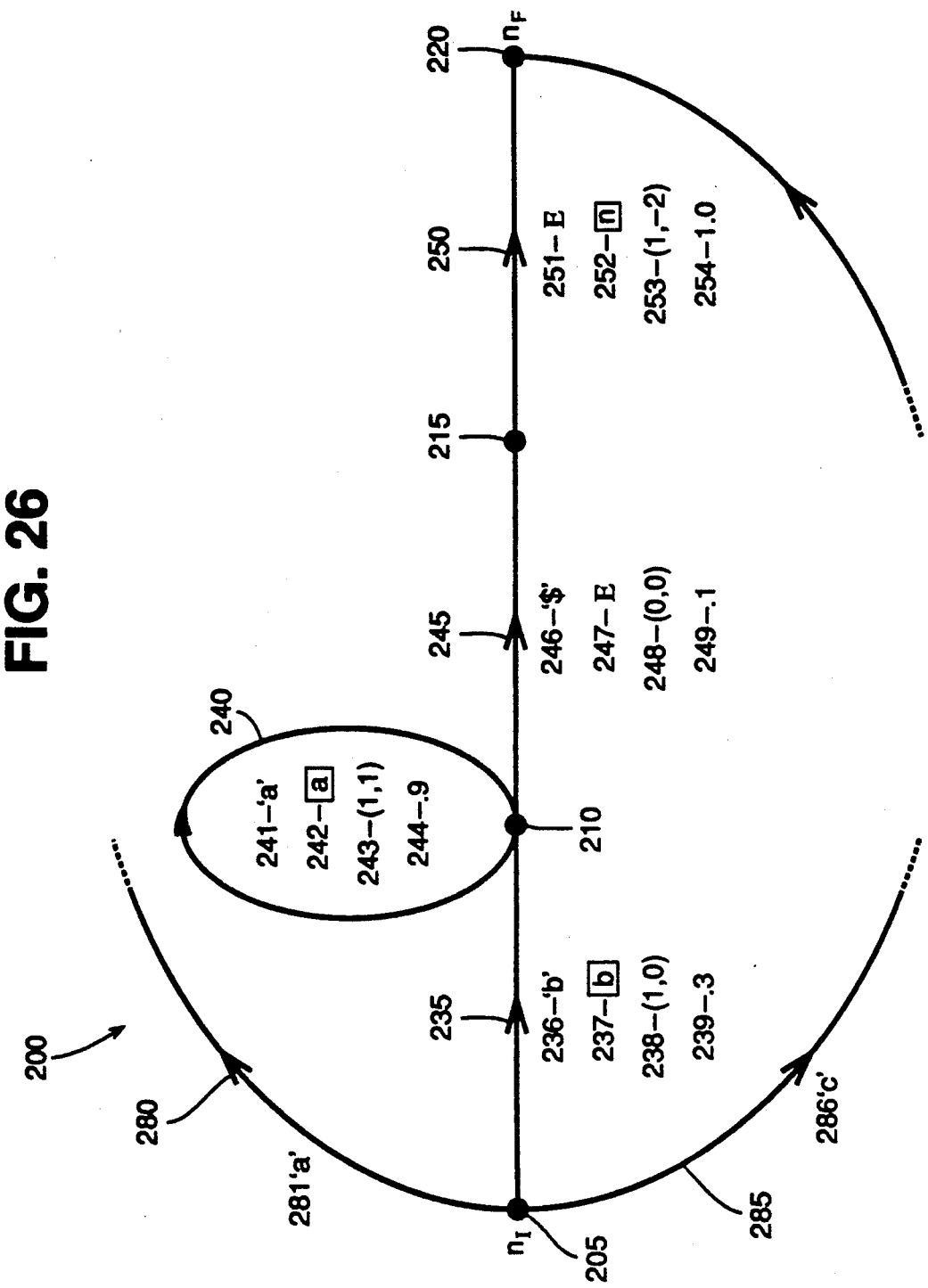
FIG. 26 shows an example of a finite state transition network of the type used in the system of the invention.

FIG. 26 shows an example 200 of an image network 120, which is similar to a finite-state transition network of the sort commonly used to represent finite-state grammars. The image network 200 consists of a set of nodes, e.g., 205, 210 which are interconnected by directed branches, e.g. 235, 240. Branch 235, for example, is said to exit node 205 and enter node 210. Nodes are sometimes called states or vertices; branches are sometimes called transitions or edges. Two distinguished states of the network are a start state 205 and a final state 220, labeled $n_I$ and $n_F$, respectively. Each transition is labeled with four attributes: the name of a character, e.g., 236, 241, the name of an image template, e.g. 237, 242, a two-dimensional displacement vector, e.g. 238, 243, which consists of horizontal and vertical displacements, dx and dy, respectively (see FIG. 3), and a transition probability, e.g. 239, 244 The character label or image template may be null, as in character 251 of branch 250 or template 247 of branch 245. The transition probabilities are used during image decoding, but not during image synthesis. Given an input string and an image network, the imager synthesizes an output image by traversing the branches of the image network while updating an image position pointer and copying templates from the template library into the output image array, as follows.

The imager starts in initial state 205 with the image position pointer initialized to coordinates (0 0) of the output image array. The first character of the input string is compared with the character labels 281, 236 and 286 on branches 280, 235 and 285 which exit from node 205. If one of the branch labels matches the input character, the imager selects the corresponding branch and performs the following actions. For illustration, suppose that the first character of the input string is a 'b'. In that case, the imager will select branch 235, since 'b' matches the character label 236. If branch 235 is selected, the imager draws a copy of image template 237 associated with branch 235 into the output array, with the origin (see FIG. 3) of the template aligned at the current image position, (0 0). The current image position is then incremented by the displacement 238 associated with branch 235 and becomes (1 0). Finally, the imager moves to node 210 by following selected branch 235. The imager repeats this process at node 210. The imager examines the second character of the input string and compares it with labels 241 and 246 on the branches which exit node 210, and selects the matching branch. If, for example, the second character is an 'a', branch 240 is selected. In that case, a copy of template 242 for branch 240 is drawn into the output image array at the current image position, which is (1 0). The current image position is incremented by displacement 243 to become (2 1) and the imager moves again to node 210.

This process continues until all the characters of the input string have been processed. At that point the imager should have reached the final state 220 or be able to reach the final state by selecting branches with null character labels. An error occurs if the imager cannot reach final state 220 at the time the input string is exhausted. An error also occurs if, at some point of the process, no branch matches the current input character. A problem also occurs if more than one branch matches the current character. Methods for generalizing the above process description to handle these and other exceptional situations are well-known in the literature of finite-state languages.

Figure 27:
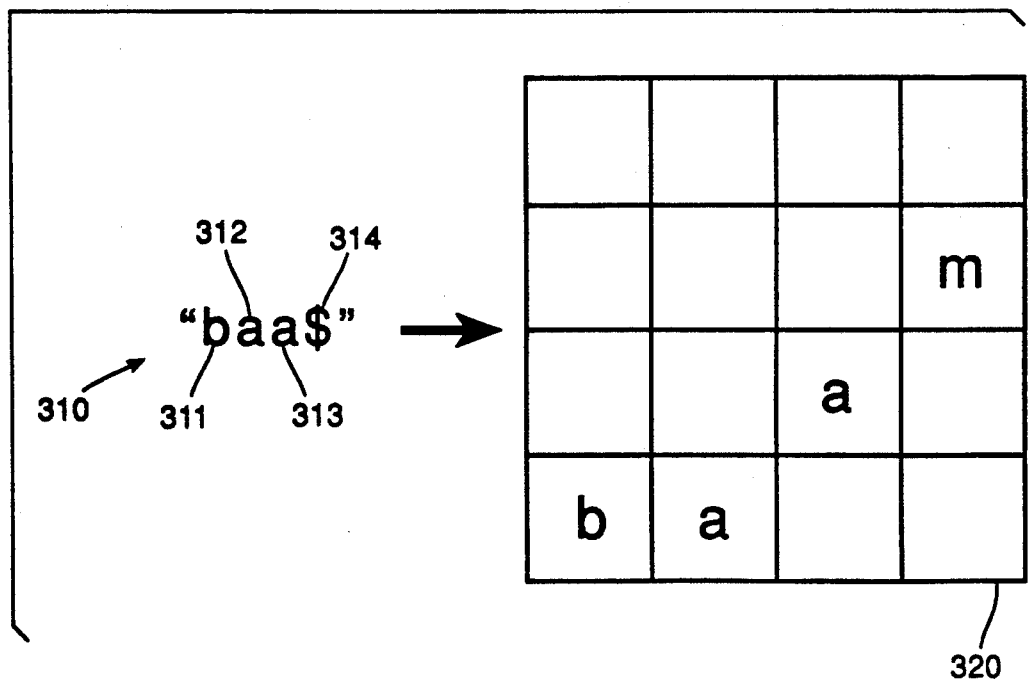
FIG. 27 illustrates operation of the network of FIG. 26 on a sample string.

FIGS. 27 and 28 illustrate the complete process for the image network 200 shown in FIG. 26 and the input string "baa$" 310. FIG. 27 shows the image 320 which is produced when string 310 is processed according to network 200. The steps 1–5 of the synthesis process are detailed in the table of FIG. 28. Prior to step 1, the imager is in initial state 205 at position (0 0) of the output array, which is blank. During step 1, the imager compares the first input character 311 with the labels of the three branches 280, 235 and 285 which exit node 205. The input character matches the label 236 on branch 235. The imager draws a copy 411 of template 237 associated with branch 235, in this case an image of a 'b', into the output array at location (0 0) and moves to node 210 and image location (1 0). In this example, the alignment point of every template is assumed to be the lower left corner of the template. In the image column, of FIG. 28 the image location at the start of step 1 is indicated in image 410 with a dot "." 412. The image location at the end step 1 is indicated with an "X" 414. Images 420, 430, 440, and 450 for steps 2–5 are marked similarly.

During step 2, the imager, starting in state 210, compares the second input character 312 with characters 241 and 246 on branches 240 and 245 which exit node 210. The input character 'a' matches label 241 of branch 240 so the imager deposits a copy 421 of template 242, in this case an image of an 'a', at the current location (1 0), advances the current location by displacement 243 to (2 1) and moves again to state 210.

During step 3, the process is repeated for the third input character 313. The imager selects branch 240, deposits a copy 431 of template 242 at location (2 1), updates the current image location to (3 2) and moves again to node 210.

During step 4, the fourth input character 314 is processed and the imager follows branch 245 to node 215. The image location pointer is not changed, since the displacement 248 associated with branch 245 is (0 0), and no template is copied into the output array, since the template label 247 associated with branch 245 specifies the null template.

At the start of step 5, the imager has exhausted the input string. However, since the character label 251 of branch 250 specifies the null character, branch 250 may be selected. A copy 451 of template 252 for branch 250, an image 'm', is deposited at the current image position (3 2), the imager moves to state 220 and the image location is updated to (4 0). At this point the imager is in the final state 220 and there are no more input characters to process, so the imaging operation is completed successfully. This example also illustrates that there need not be a one-to-one correspondence between the input string symbols and the resultant bitmap image. For instance, the string to be imaged could have in it information corresponding to comments in code not meant to be included in the bitmap. Similarly, the recognizer could include in its output information about the bitmap (such as its source) not present in the bitmap itself. Examples of this are the logical structure tags in FIG. 21. Also, the bitmap symbols could be different than the string symbols (note '$' in the string and 'm' in the bitmap), and no symbol need be present in the bitmap if the recognizer will automatically generate a character under certain prescribed conditions.

Figure 29:
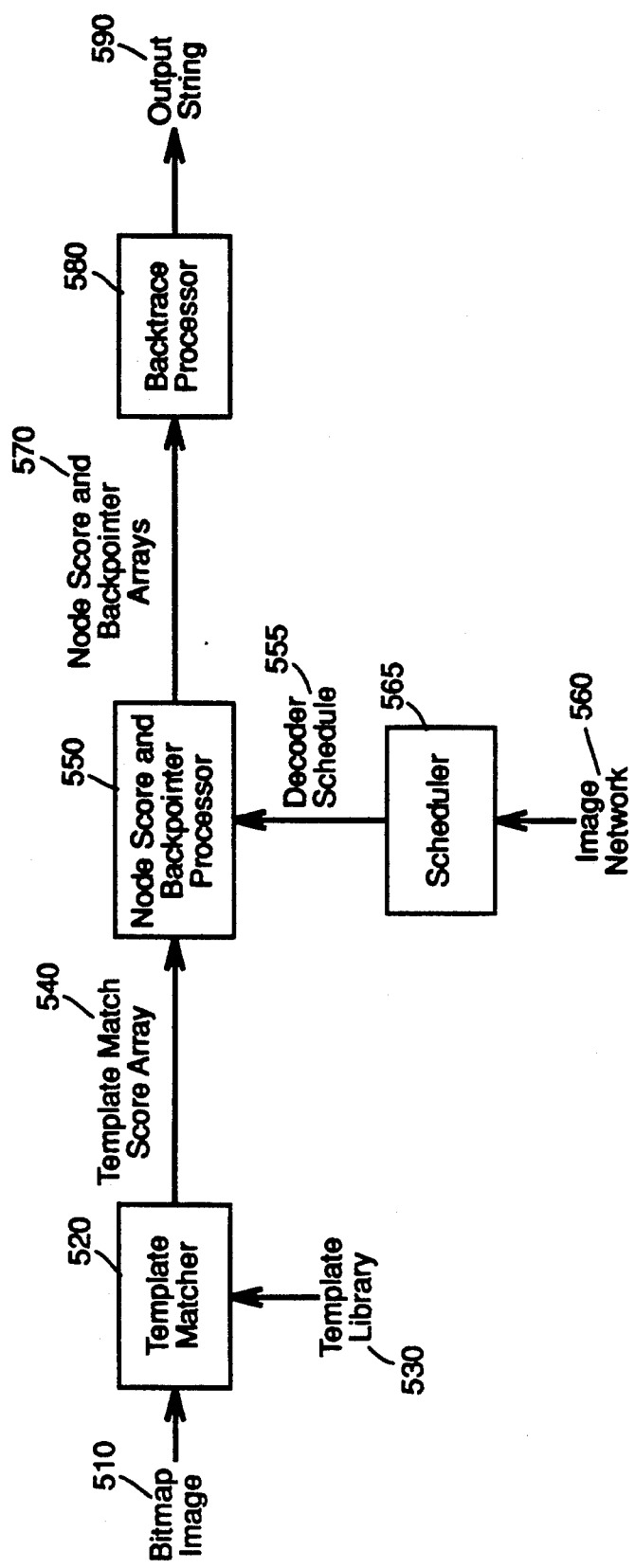
FIG. 29 is a block diagram of one form of image recognizer in accordance with the invention for decoding an image bitmap to reconstruct the string from which it was formed.

FIG. 29 shows the use of an image network for decoding an input bitmap 510 to generate an output string 590. For the example given in FIG. 27, the same image network 200 would be used. The template matcher 520 compares each member of the template library 530 (which is the same as the template library 130 used in the imager of FIG. 25) with the input image 510, using a matching function which computes $L(Z \mid Q)$ defined in (25). The output of the template matcher is a set of score arrays 540, one for each template from the library, which contains the numerical match score for the template at each location of the input image. The node score and backpointer processor 550 computes a score array and a backpointer array 570 for each node of the image network 560. The score array for a node contains the numerical match score $L(n; x)$ defined in (35) for that node aligned at each location of the input image. The backpointer array for a node identifies the most likely branch into the node, that is, the branch at each image location which maximizes (35). The inputs to the node score and backpointer processor 550 are the template match scores 540 for the template matcher and a decoder schedule 555 from image network 560, which is the same image network 120 used in the imager of FIG. 25. Finally, the backtrace processor 580 uses the backpointer array 570 to generate a path through the image network 560, and from this path, an output string 590 is formed by concatenating the character labels of the branches of the path. This will, for the example given in FIG. 27, reconstruct the string "baa$".

One form of an algorithm that when executed by the node score and backpointer processor 550 will produce the arrays 570 as described above is described in detail in FIG. 30. Processor 550 fills the node score and backpointer arrays 570 in row-major order—all values are computed for the first row, then all values are computed for the second row, and so on, until all rows are completed. The computation for each row in turn is organized as a series of "passes". During each pass, one row is computed for each array in some subset of the score and backpointer arrays. A row is computed either left-to-right, in order of increasing x position, or right-to-left, in order of decreasing x position, again, as specified by the schedule. A left-to-right pass is called a "forward" pass; a right-to-left pass is called a "reverse" pass. At each x position within a pass, the scores and backpointers are computed for some subset of the nodes of the image network, in a prescribed order.

The algorithm in FIG. 30 is a nested iteration with 4 levels. The outermost level, steps 602 through 632, iterates over rows. Step 602 initializes the row counter y to 1. In step 630 the row counter is compared with the rows in the image, H. If not all rows have been computed, the row counter is incremented in step 632 and the next row is processed. The second level, steps 604 through 628, iterates over passes. The pass counter is initialized in step 604, compared with the total number of passes K in step 626, and incremented in step 628. The third level, steps 605 through 624, iterates over horizontal position within the row specified by row counter y. Three horizontal position pointers are maintained simultaneously. Pointer $X_F$ specifies horizontal position for the forward passes. $X_F$ is initialized to 1 in step 605, incremented in step 624, and compared in step 622 with the number of locations within a row, W. Pointer $X_R$ is the horizontal position for backward passes. It is initialized to W in step 605 and decremented in step 624. Pointer X is set in steps 608, 610 and 612 to either $X_F$ or $X_R$, according to whether the current pass is forward or backward. The fourth level of the iteration, steps 614 through 620, computes the score $L(n,x,y)$ and backpointer $B(n,x,y)$ for each node n of the pass specified by the pass counter at the row specified by y and the horizontal position specified by x. The actual computation of score $L(n,x,y)$ and backpointer $B(n,x,y)$ occurs in step 616, which is described in FIG. 31.

Figure 31:
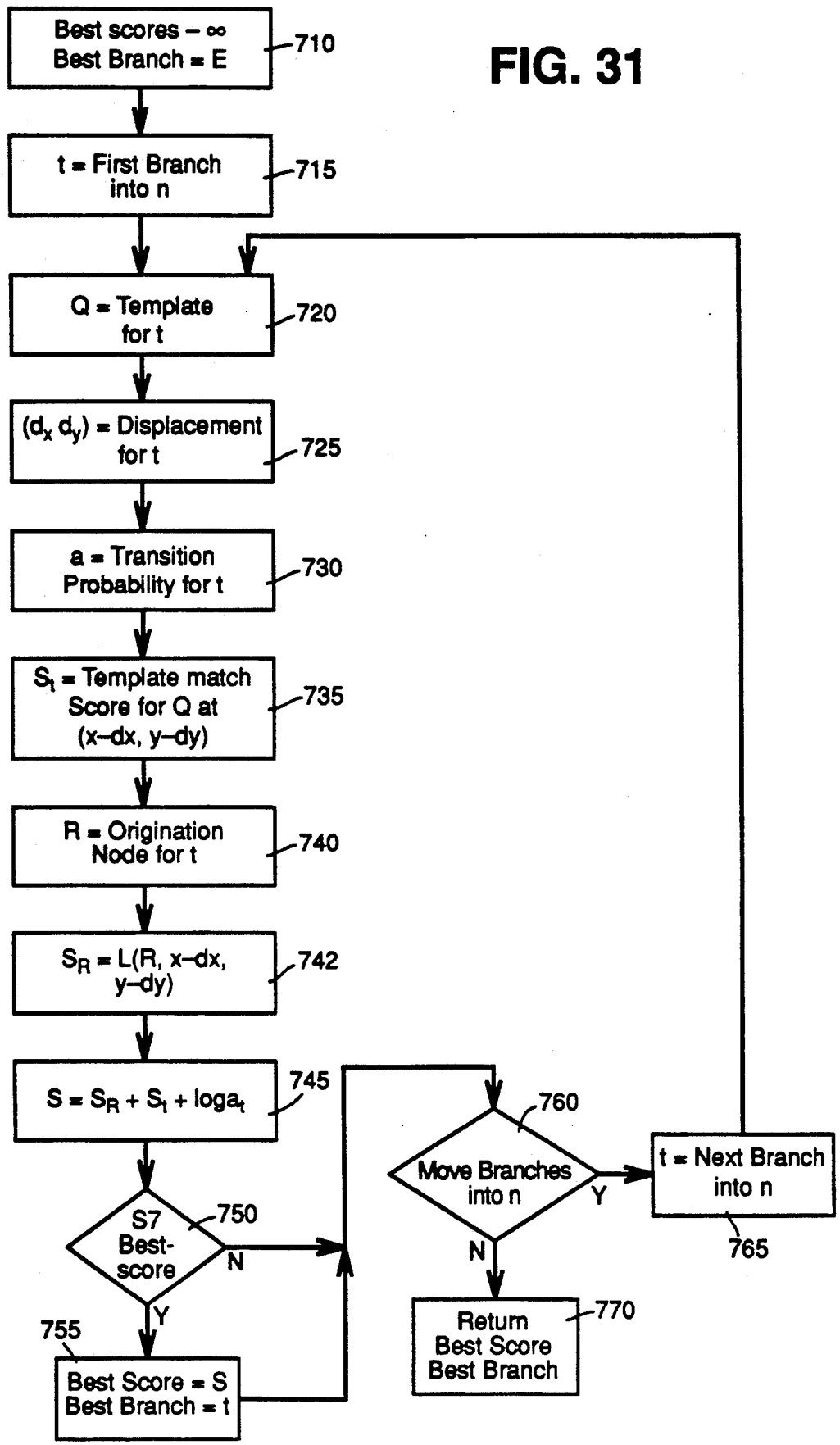
FIG. 31 is a flow chart illustrating the computations carried out during step 616 of the process of FIG. 30.

FIG. 31 describes a example of the computation of the node score $L(n,x,y)$ and backpointer $B(n,x,y)$ for a particular node n and image position (x y). This algorithm is a two-dimensional generalization of the standard one-dimensional dynamic programming step used in speech recognition with hidden Markov models. The computation involves finding that branch, among all branches which enter the specified node n, which maximizes the score of the node at the specified image position (x y). The maximum score and the identification of the corresponding best branch are returned in step 770 as $L(n,x,y)$ and $B(n,x,y)$. During the course of the computation, variables bestscore and bestbranch, initialized in step 710, contain the best score, and the corresponding branch, encountered thus far.

Steps 715 through 765 iterate over the branches which enter node n. Step 715 initializes the branch index t to the first branch into n; steps 760 and 765 repeat the iteration until all branches of n have been considered. Steps 720, 725, and 730 retrieve the template Q, displacement (dx dy) and transition probability a associated with branch t. These correspond to the attributes of the branches or transitions illustrated in FIG. 26. Step 735 retrieves the template match score for template Q at image position (x-dx y-dy) from the template score arrays which were previously supplied as input 540 to the node score and backpointer processor 550. Step 740 retrieves the identification of the node L from which branch t originates and step 742 retrieves the node score value $L(n,x,y)$ for node L at image position (x-dx y-dy). This value was computed during a previous execution of the algorithm in FIG. 31; the decoder schedule 555 should insure that any node score values required to compute $L(n,x,y)$ during the current computation are available through previous computation. Step 745 computes the candidate node score for the current branch. Finally, steps 750 and 755 update bestscore and bestbranch if the candidate score computed in 745 is greater than the previous value of bestscore.

The template matcher 520 computes $L(Z \mid Q)$ defined in (25) of Appendix B, for each template Q, aligned at each image location. Implementation is straightforward.

The scheduler 565 producer a schedule 555 from image network 560. The schedule specifies the order in which the entries in the node score and backpointer arrays 570 are computed, and should insure that the data dependencies contained in (35) are obeyed. General approaches and theory for solving such scheduling problems are known in the VLSI field. Appendix D describes a specific algorithm for generating a decoder schedule based on this theory.

Figure 32:
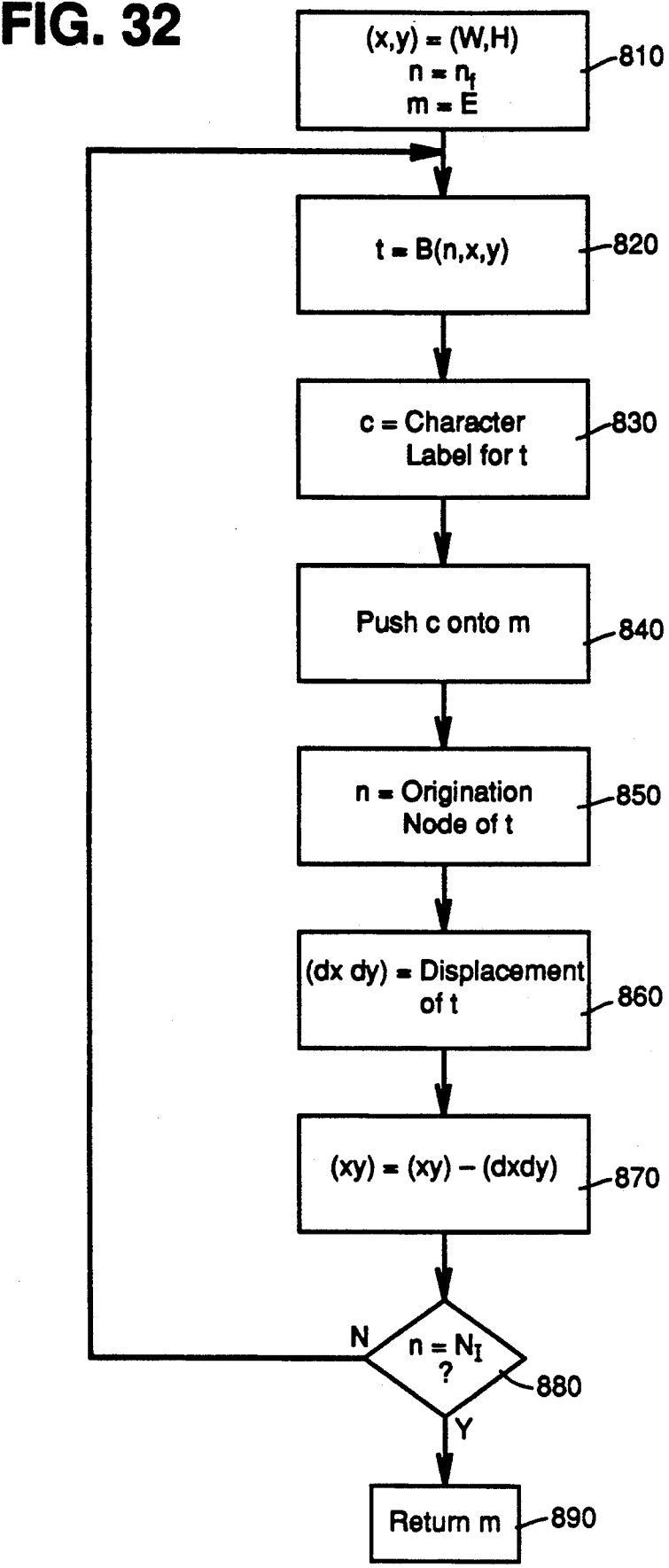
FIG. 32 is the flow chart of one form of algorithm that the backtrace processor of FIG. 29 can use in carrying out the invention.

The backtrace processor 580 computes output string 590 from the node score and backpointer arrays 570, using the algorithm as an example described in FIG. 32. The backtrace processor traces back from the final node $n_F$ at image position (W H) by successively following the branches identified in the backpointer array until the start node $n_I$ is reached. The character labels on the branches encountered during this backtrace are concatenated to form the output string 590.

Step 810 initializes the current image position (x y) to (W H), initializes the current node n to the final node $n_F$, and initializes the output string m to the null string. Step 820 sets t to the branch $B(n,x,y)$ which was previously computed by the node score and backpointer processor 550. The character label 'c' for branch t is retrieved in step 830 and pushed onto the beginning of string m in step 840. Step 850 updates n to the node from which branch t originates and step 860 retrieves the displacement (dx dy) for branch t. Step 870 updates the current image position (x y) by subtracting the displacement (dx dy). The new value of node n established in step 850 is compared with $n_I$, the start node of the image network, in step 880. If $n_I$ has been reached, the backtrace terminates in step 890 and returns the string m. Otherwise, the process repeats from step 820.

The foregoing represents examples of algorithms that can be used to implement the system of the invention, but it will be understood that the invention is not limited thereto.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

APPENDIX A

FIG. 1 shows a formulation of the document recognition problem based on classical communication theory. A stochastic message source 10 selects a finite string M from a set of candidate strings according to a prior probability distribution $P_r\{M\}$. A message may be a plain text string, text with embedded layout or logical structure tags (e.g. LAT$_E$X, [L. Lamport, LAT$_E$X, A Document Preparation System, 1986, Reading: Addison-Wesley], or SGML) or any other encoding of information into a linear sequence of discrete symbols. FIG. 2 shows three examples of message fragments, consisting of plain text in (a), text with embedded LAT$_E$X commands in (b), and a textual representation of printed music notation in (c).

An imager 11 converts the message into an ideal binary image $Q=\{q_i \mid i \in \Omega\}$, drawn from a universe of binary images whose pixels are indexed by $\Omega$. We will assume that images are rectangular, so that $$\Omega = [0,W) \times [0,H) \qquad (1)$$

where W and H are the image width and height, respectively. We use an image coordinate system in which x increases to the right, y increases downward, and the upper left corner is at $x=y=0$. We will usually assume that the imager is deterministic, so that there is a unique image $Q_M$ associated with each message M, but more generally the imager may include stochastic elements to model effects such as coordinate quantization.

A channel 12 maps the ideal image into an observed image $Z=\{z_i \mid i \in \Omega\}$ by introducing distortions due to printing and scanning, such as skew, blur and additive noise. A decoder receives image Z and produces an estimate M of the original message. The decoder will achieve the minimum probability of error if it chooses M according to the maximum a posteriori (MAP) criterion, so that $$P_r\{\hat{M}|Z\} = \max_M P_r\{M|Z\} \qquad (2)$$

By Bayes' rule $$P_r\{M|Z\} = \frac{P_r\{M,Z\}}{P_r\{Z\}} \qquad (2a)$$

$$= \frac{P_r\{Z|M\}P_r\{M\}}{P_r\{Z\}}$$

The conditional probability $P_r\{Z|M\}$ represents the combined effects of the imager and channel. These may be separated by noting that $$P_r\{M,Z\} = \sum_Q P_r\{M,Q,Z\} \qquad (2b)$$

$$= \sum_Q P_r\{Z|M,Q\}P_r\{Q|M\}P_r\{M\}$$

If we assume that the imager and channel are independent, then $$P_r\{Z|M,Q\} = P_r\{Z|Q\} \qquad (3)$$

If we further assume that the imager is deterministic, then $$P_r\{Q|M\} = \begin{cases} 1 \text{ if } Q = Q_M \\ 0 \text{ otherwise} \end{cases} \qquad (4)$$

Finally, if we assume that the imager is a 1-to-1 mapping, then $$P_r\{M\} = P_r\{Q_M\} \qquad (5)$$

Collectively, these assumptions blur the distinction between M and Q and allow us to write $$P_r\{M|Z\} = \frac{P_r\{Z|Q_M\}P_r\{Q_M\}}{P_r\{Z\}} \qquad (6)$$

Thus, we may interpret the image decoding problem as one of estimating either M or $Q_M$.

Since $P_r\{Z\}$, the prior probability of observing Z, is independent of M, it is irrelevant to choosing M and may be omitted. More generally, the MAP decision rule may be implemented by maximizing any monotone function of the right hand side of (5). In particular, it will be turn out to be convenient to define the decision function as $$L(M,Z) \equiv \log \frac{P_r\{Z|Q_M\}P_r\{Q_M\}}{P_r\{Z|Q_0\}} \qquad (7)$$

where $P_r\{Z \mid Q_0\}$ is the probability of observing Z given that Q is the all-white background image $Q_0$. Finally, if we define $$L(Z|Q) \equiv \log \frac{P_r\{Z|Q\}}{P_r\{Z|Q_0\}} \qquad (8)$$

we find that MAP decoding is equivalent to maximizing $$L(M,Z) = L(Z|Q_M) + \log P_r\{Q_M\} \qquad (9)$$

As (9) suggests, there are three main problems to be solved in the design of a document image recognition system. First, it is necessary to develop a model of the image source, in order to compute $\log P_r\{Q_M\}$. Second, it is necessary to understand the characteristics of the channel, in order to compute $L(Z \mid Q_M)$. Finally, a search algorithm is necessary in order to perform the maximation of (9) in a computationally efficient manner.

APPENDIX B

Figure 7:
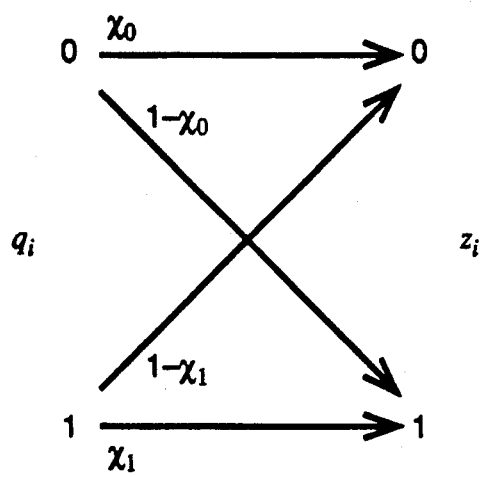
FIG. 7 illustrates a bit-flip noise model.

While realistic defect models for imaging systems can be quite complicated, we have focused on the very simple asymmetric bit-flip noise model shown in FIG. 7. This model assumes that each pixel of the ideal image Q is independently perturbed. The probability of a 1 (black) pixel in the ideal image Q surviving as a 1 in the observed image Z is $\pi_1$. Similarly, the probability of a 0 being observed as a 0 is $\pi_0$. The noise parameters are assumed to be constant over the image.

In Appendix C we show that, for the asymmetric bit-flip channel, $$L(Z|Q) = B_Q + (\alpha + \beta) \sum_{i \in Q} z_i \qquad (25)$$

where $$B_Q = \sum_{i \in Q} [\log \pi_1 - \log \pi_0 - \beta] \qquad (26)$$

and $$\alpha = \left| \log \frac{\pi_0}{1 - \pi_0} \right| \qquad (27)$$

$$\beta = \left| \log \frac{\pi_1}{1 - \pi_1} \right| \qquad (28)$$

are the background and foreground weights, respectively. $B_Q$ is a class-dependent bias term which is independent of Z. The second term on the right-hand side of (25) may be computed by counting the nonzero bits in the logical AND of images Z and Q.

We also establish in Appendix C that, because of (23), if $Q_\pi$ is the composite image associated with path x through a Markov source, then $$L(Z|Q_\pi) = \sum_{i=1}^{P} L(Z|Q_{ti}[\bar{x}_i]). \qquad (29)$$

APPENDIX C

The goal of this section is to obtain an expression for L(Z | Q) for the asymmetric bit-flip channel shown in FIG. 7. The initial steps of the derivation will be based on a more general image generation model. Let $$p_i P_r\{z_i = 1 | C\} \qquad (48)$$

for $i \in \Omega$ be the probability that the $i^{th}$ pixel of Z is on, when Z is drawn from some class of images C. In the present case, C is the set of possible observed images Z, given channel input Q.

For notational simplicity, conditioning on C (or Q) will only be explicitly indicated where necessary for clarity.

Under an assumption of independent pixels, the probability of Z is then $$P_r\{Z\} = \prod_{i|z_i=1} p_i \prod_{i|z_i=0} (1 - p_i) \qquad (49)$$

so that $$\log P_r\{Z\} = \sum_{i|z_i=1} \log p_i + \sum_{i|z_i=0} \log(1 - p_i). \qquad (50)$$

By noting that $$\sum_{i|z_i=1} \log p_i = \sum_{i \in \Omega} \log p_i - \sum_{i|z_i=0} \log p_i \qquad (51)$$

$$\log P_r\{Z\} = \sum_{i \in \Omega} \log p_i + \sum_{i|z_i=0} \log \frac{1 - p_i}{p_i} \qquad (52)$$

$$= \sum_{i \in \Omega} \log p_i + \sum_{i \in \Omega} (1 - z_i) \log \frac{1 - p_i}{p_i}$$

$$= \sum_{i \in \Omega} \left[ \log p_i - (1 - z_i) \log \frac{p_i}{1 - p_i} \right].$$

Furthermore, since $$\log p_i - (1 - z_i) \log \frac{p_i}{1 - p_i} = \log(1 - p_i) - z_i \log \frac{1 - p_i}{p_i} \qquad (53)$$

(52) may be written $$\log P_r\{Z\} = \sum_{i|p_i \geq .5} \left[ \log p_i - (1 - z_i) \log \frac{p_i}{1 - p_i} \right] + \qquad (54)$$

$$\sum_{i|p_i < .5} \left[ \log(1 - p_i) - z_i \log \frac{1 - p_i}{p_i} \right]$$

If we define binary image $\tilde{Q} = \{\tilde{q}_i | i \in \Omega\}$ by $$\tilde{q}_i = \begin{cases} 1 & \text{if } p_i \geq .5 \\ 0 & \text{otherwise} \end{cases} \qquad (55)$$

then (54) may be written $$\log P_r\{Z\} = \sum_{i \in \Omega} \log P_r\{\tilde{q}_i\} - \sum_{i \in \Omega} |z_i - \tilde{q}_i|^2 \left| \log \frac{p_i}{1 - p_i} \right| \qquad (56)$$

Finally, if we define $$w_i = \left| \log \frac{p_i}{1 - p_i} \right| \qquad (57)$$

then $$\log P_r\{Z\} = \sum_{i \in \Omega} \log P_r\{\tilde{q}_i\} - \sum_{i \in \Omega} w_i(z_i - \tilde{q}_i)^2 \qquad (58)$$

and $$P_r\{Z\} = P_r\{Q^N\} e^{-\sum_{i \in \Omega} w_i \left( z_i - \frac{\tilde{N}}{q_i} \right)^2} \qquad (59)$$

Image $\tilde{Q}$ may be viewed as a template for image class C. Note from (59) that Q is the most probable member of C. Returning to the asymmetric bit-flip model, if $\pi_0 > 0.5$ and $\pi_1 > 0.5$, then $Q = \tilde{Q}$ and we need not distinguish between them. In that case, $$p_i = \begin{cases} \pi_1 & \text{if } i \in Q \\ (1 - \pi_0) & \text{if } i \in \Omega - Q \end{cases} \qquad (60)$$

so that $p_i$ depends on the value of $q_i$ but is otherwise independent of i. Recall that "i ∈ Q" should be read as "i ∈ support [Q]". If we define $$\alpha = \left| \log \frac{\pi_0}{1 - \pi_0} \right| \tag{61}$$

$$\beta = \left| \log \frac{\pi_1}{1 - \pi_1} \right| \tag{62}$$

to be the background and foreground weights respectively, then $$\log P_r\{Z\} = \sum_{i \in Q} \log \pi_1 + \tag{63}$$

$$\sum_{i \in \Omega - Q} \log \pi_0 - \beta \sum_{i \in q} (z_i - 1)^2 - \alpha \sum_{i \in \Omega - Q} z_i.$$

Using the relations $$\sum_{i \in \Omega - Q} \log \pi_0 = \sum_{i \in \Omega} \log \pi_0 - \sum_{i \in \Omega} \log \pi_0 \tag{64}$$

$$\sum_{i \in \Omega - Q} z_i = \sum_{i \in \Omega} z_i - \sum_{i \in \Omega} z_i \tag{65}$$

in (63) and combining terms gives $$\log P_r\{Z\} = \sum_{i \in Q} \log \frac{\pi_1}{\pi_0} + \tag{66}$$

$$\sum_{i \in \Omega} \log \pi_0 - \alpha \sum_{i \in \Omega} z_i + \alpha \sum_{i \in \Omega} z_i - \beta \sum_{i \in Q} (z_i - 1)^2.$$

Finally, using the relation $$\sum_{i \in Q} (z_i - 1)^2 = \sum_{i \in Q} 1 - \sum_{i \in Q} z_i \tag{67}$$

in (66) and rearranging gives $$\log P_r\{Z\} = \sum_{i \in Q} [\log \pi_1 - \log \pi_0 - \beta] + \tag{68}$$

$$\left[ \sum_{i \in \Omega} \log \pi_0 - \alpha \sum_{i \in \Omega} z_i \right] + (\alpha + \beta) \sum_{i \in Q} z_i$$

The bracketed term on the right hand side of (68) is independent of Q and, in fact, is $\log P_r\{Z|Q_0\}$, where $Q_0$ is the all-white background image. Thus (25) and (26) follow for the asymmetric bit-flip noise channel.

The log normalized probability (25) possesses an important decomposition property. If template Q is expressed as a disjoint union of sub-templates $Q_1 \ldots Q_p$, so that $$Q = \bigcup_{i=1}^{P} Q_i \tag{69}$$

and $$Q_i \cap Q_j = \phi \tag{70}$$

for $i \neq j$, then $$L(Z|Q) = \sum_{i=1}^{P} L(Z|Q_i) \tag{71}$$

Note that (70) expresses a constraint on the supports, not the bounding boxes of $Q_i$ and $Q_j$. Thus, (71) may be used to compute the log normalized probability (25) for a composite template even when the bounding boxes of the constituent templates overlap, as long as the constituent supports are disjoint.

Finally, because of (23), the preconditions for decomposition (71) are satisfied for images generated by Markov sources via (21), and (29) follows.

APPENDIX D

Here we show that a strongly row-major schedule of the form (41) and (42) may be found for any computable image decoder which has the property that $\Delta y_\pi \geq 0$ for every loop $\pi$. Our approach is constructive, and is based on the theory of regular iterative algorithms. See S. Rao, Regular Iterative Algorithms and Their Implementations on Processor Arrays, PhD thesis, Stanford University, October 1985. For simplicity, the construction is discussed in terms of the 4-level iterative algorithm presented before; the relationship to (41) and (42) should be clear.

Figure 9:
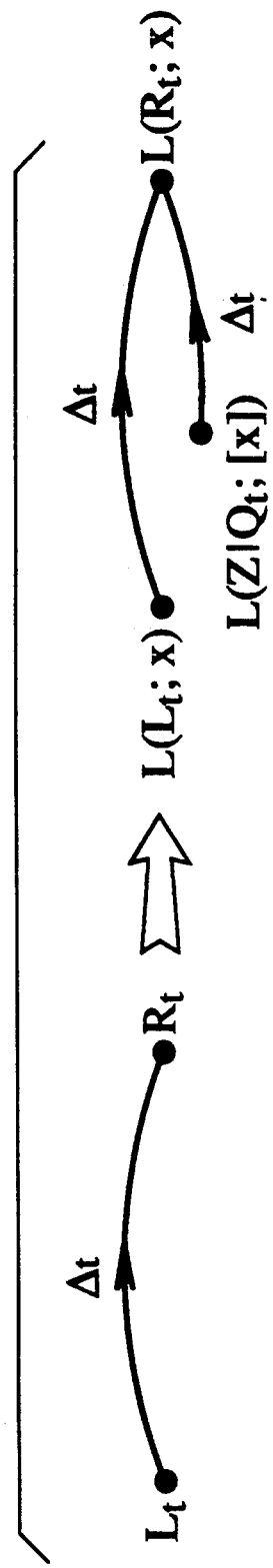
FIG. 9 illustrates construction of an RDG for a Markov source decoder.

The reduced dependence graph (RDG) (S. Rao, Regular Iterative Algorithms and Their Implementations on Processor Arrays, PhD thesis, Stanford University, October 1985) for a Markov source decoder is derived from the decoder graph by replacing each transition by a pair of edges and introducing a new node, as shown in FIG. 9. In general, the nodes of an RDG represent variables whose values are to be computed at each $\vec{x} \in \Omega$. There is an edge from node $n_1$ to node $n_2$, with displacement label $\vec{\Delta}$, if the value of $n_1$ at $\vec{x} - \vec{\Delta}$ is required to compute $n_2$ at $\vec{x}$. Nodes with no incoming branches are called input nodes; the branches from an input node are often called input branches. The input nodes of a decoder RDG represent the values of $L(Z \mid Q_t[\vec{x}])$. For purpose of scheduling, it is assumed that the input values can generated in whatever order is necessary to satisfy the constraints represented by the rest of the graph. Nodes with no outgoing branches are called output nodes; the branches to an output node are often called output branches. A decoder RDG typically has a single output node, the final node $n_F$. As FIG. 9 suggests, the primary effect of transforming a decoder graph into an RDG is that the dependence of $L(R_t; \vec{x})$ on $L(L_t; \vec{x} - \vec{\Delta}_t)$ is represented separately from its dependence on $L(Z \mid Q_t[\vec{x} - \vec{\Delta}_t])$. This allows graph transformations to be applied which modify differently the displacements on the two branches into $R_t$, as discussed below.

We will assume that the value of a variable, once computed, is available anytime thereafter; no constraints are placed on the total storage required by a schedule to retain values for future access. Suppose G is a decoder RDG such that for every loop $\pi$, $\Delta y_\pi \geq 0$. We show below that such a graph may be transformed into an equivalent RDG which satisfies the stronger condition that the only branches with negative y displacement are input or output branches. Furthermore, by introducing appropriate delays in the definitions of the input and output variables, negative displacements may be eliminated from input and output branches as well. We anticipate these results and assume that all branches of G have non-negative y displacement. Clearly, for purposes of constructing a strongly row-major schedule, any branch t for which $\Delta y_t > 0$ imposes no constraint, since we assume that all previously computed values are available. Consider the graph G' formed by deleting from G all branches t for which $\Delta y_t > 0$ and then all nodes which have no remaining incoming or outgoing branches. Let $N_+$ denote the set of deleted nodes. It is clear that any loop $\pi$ for which $\Delta y_\pi = 0$ must lie entirely within G'. A strongly row-major schedule for G may be constructed from a schedule for G' by computing $L(n;\vec{x})$ for $n \in N_+$ during any of the passes of the G' schedule, or by defining a new pass for $N_+$. Thus we turn attention to constructing a schedule for G'.

Decompose G' into its tightly connected components (TCCs) (S. Rao, Regular Iterative Algorithms and Their Implementations on Processor Arrays, PhD thesis, Stanford University, October 1985), defined as the vertex disjoint subgraphs of G' which satisfy the conditions:

there exists a directed path from any node to any other node within the same component, if a component contains a single node, then that node has a self-loop associated with it, and if there exists a directed path from a node in one component to a node in a different component, then there is no return path.

Figure 10:
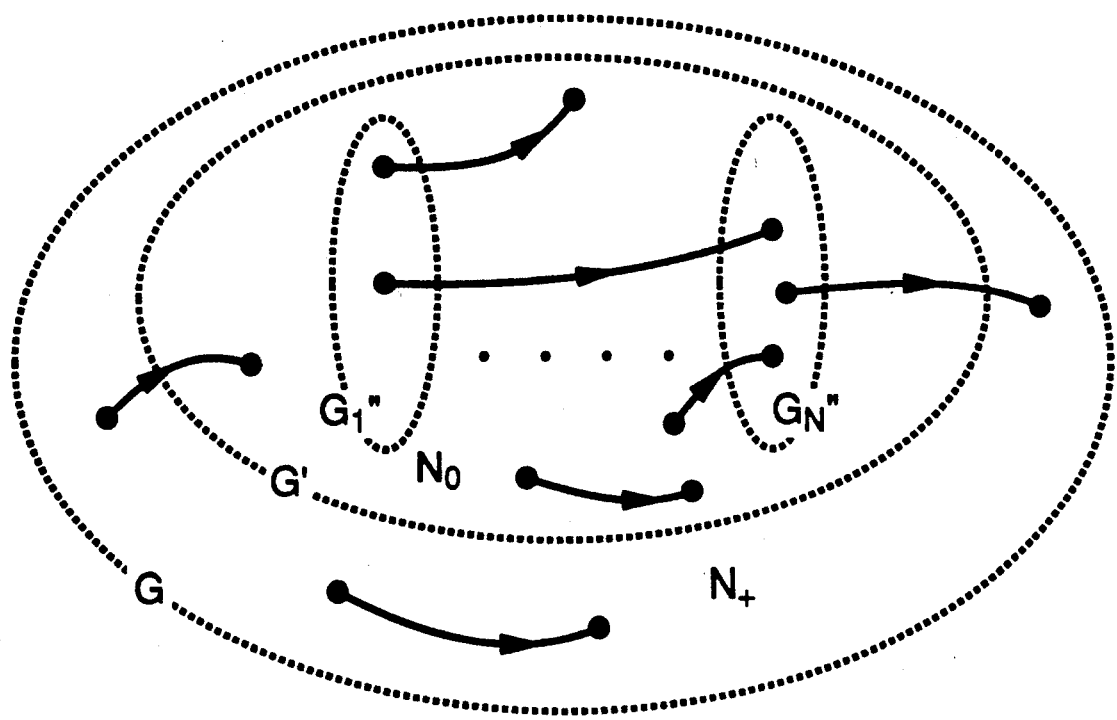
FIG. 10 illustrates the decomposition of a decoder RDG.

The tightly connected components of a graph may be found by trivially filtering the output of any algorithm for finding strongly connected components (A. V. Aho, J. E. Hopcroft, J. D. Ullman, The Design and Analysis of Computer Algorithms, 1974, Reading: Addison-Wesley). It is clear that any loop $\pi$ in G with $\Delta y_\pi = 0$ must lie entirely within one of the TCCs of G'. Let the tightly connected components of G' be denoted $G''_1, \ldots, G''_N$ and let $N_0$ denote the nodes of G' which belong to no TCC. FIG. 10 summarizes the decomposition of G and illustrates the relationships among G, $N_+$, G', $N_0$ and $G''_1, \ldots, G''_N$.

A schedule for G' is constructed in the following way. Let $\bar{G}'$ be the graph derived from G' by merging the nodes of each TCC $G''_i$ into a single "super" node, i.e. the nodes of $\bar{G}'$ are $$N_0 \cup \{G''_1, \ldots, G''_N\} \quad (72)$$

The branches of $\bar{G}'$ are those branches of G' which do not belong to any $G''_i$. That is, $\bar{G}'$ contains those branches of G' which either 1.) connect different TCCs; 2.) connect a TCC to an element of $N_0$; or 3.) connect two elements of $N_0$. Since $\bar{G}'$ is acyclic, it is straightforward to sort its nodes so that $n_1$ proceeds $n_2$ if there is a branch from $n_1$ to $n_2$. Each node of $\bar{G}'$ corresponds to one pass in the schedule for G', ordered according to this sort. The nodes of $\bar{G}'$ which are members of $N_0$ define passes in which $L(n;\vec{x})$ is computed for a single node n. The node of $\bar{G}'$ which corresponds to TCC $G''_i$ defines a pass in which $L(n;\vec{x})$ is computed for the nodes of $G''_i$. It remains to show how to schedule a pass for each tightly connected component $G''_i$ in isolation.

Let $G''_i$ be a TCC of G', where the branches of $\bar{G}'$ into (out of) $G''_i$ are viewed as input (output) branches of $G''_i$. Since G is computable and every branch of $G''_i$ has zero y displacement, it is obvious that $G''_i$ contains no loop $\pi$ with $\Delta x_\pi = 0$. More strongly, $G'_i$ has the property that $\Delta x_\pi$ for every loop $\pi$ within it has the same sign. To show this, suppose, to the contrary, that $G''_i$ contains loops $\pi_1$ and $\pi_2$, where $\Delta_{\pi_1} > 0$ and $\Delta x_{\pi_2} < 0$.

Let $n_1$ and $n_2$ be nodes in $\pi_1$ and $\pi_2$, respectively. By the definition of tightly connected component, there is a loop $\pi_3$ in $G''_i$ which contains $n_1$ and $n_2$. Suppose $\Delta x_{\pi_3} > 0$ (the argument for $\Delta x_{\pi_3} < 0$ is similar). Since $\pi_3$ intersects both $\pi_1$ and $\pi_2$, it is possible to construct a loop $\pi_0$ in $G''_i$ which traverses each $\pi_j$, $j = 1, 2, 3$, any specified number of times $k_j \geq 1$. The total x displacement of $\pi_0$ is $$\Delta x_{\pi 0} = \sum_{j=1}^{3} k_j \Delta x_{\pi j} \quad (73)$$

Since the right-hand-side of (73) contains both positive and negative terms, it is possible to adjust the $k_j$ so that $\Delta x_{\pi 0} = 0$, contradicting the assumed computability of G. Thus, every loop within $G''_i$ has the same sign x displacement.

Suppose the loops of $G''_i$ have positive x displacement. As we show immediately below, $G''_i$ may be transformed into an equivalent graph in which each internal branch has non-negative x displacement, by "pushing" all negative branch displacements to the input and output branches. The nodes of the transformed $G''_i$ may then be sorted using the standard speech HMM scheduling techniques. Components $G''_i$ with negative loop x displacements are handled similarly, except that the $L(n;\vec{x})$ is computed in order of decreasing x (right-to-left). This completes construction of a strongly row-major schedule for G.

Finally, we show that if G is an RDG in which every loop has non-negative x (or y) displacement then there is an equivalent RDG $\hat{G}$ such that all internal branches of $\hat{G}$ have non-negative x (or y) displacement. Clearly, it is sufficient to demonstrate this for RDGs with scalar displacements. Thus, let G be an RDG with scalar branch displacements such that every loop in G has non-negative displacement. Let $n \in N$ be a node of G which is not an input or output node, let $$I_n = \{t | R_t = n\} \quad (74)$$

$$O_n = \{t | L_t = n\} \quad (75)$$

be the branches of G which terminate on an originate from n, respectively, and let $\xi$ be an integer constant. Define $\hat{G}$ to be the RDG which is identical to G, but with branch displacements $\hat{\Delta}_t$ defined by $$\hat{\Delta}_t = \begin{cases} \Delta_t - \xi & \text{if } t \in I_n \\ \Delta_T + \xi & \text{if } t \in Q_n \\ \Delta_t & \text{otherwise} \end{cases} \quad (76)$$

Figure 11:
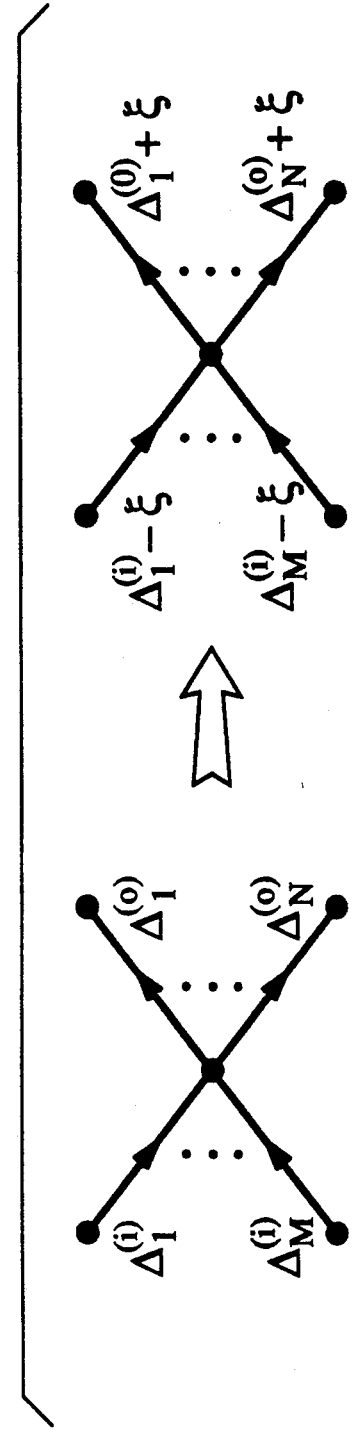
FIG. 11 schematically illustrates displacement pushing across a node.

G is the RDG obtained by "pushing" an amount of displacement $\xi$ across node n, as illustrated in FIG. 11. It is straightforward to show that this transformation does not modify the input-output behavior of G, in the sense that $$L_{\hat{G}}(n_F;\vec{x}) = L_G(n_F;\vec{x}) \quad (77)$$

for every $\vec{x}$ and output node $n_F$. We will find a set of transformations, each defined by (76), which collectively results in a non-negative displacement on each internal branch. Note that if a transformation (76) is applied at an input or output node (where $I_n$ or $O_n$ empty), the effect is to introduce an overall spatial offset in the definition of the corresponding input or output variable. Since it is straightforward to keep track of such offsets, we will simplify the exposition by allowing the transformation to be applied to any node. In that case, we can show that all branch displacements may be made non-negative. A set of transformations of type (76) may be characterized by the set of displacements $\Xi = \{\xi_n \mid n \in N\}$ pushed across the nodes of G. After applying the transformations corresponding to $\Xi$, the final displacement on each branch t is given by $$\hat{\Delta} = \Delta_t + \xi_{Lt} - \xi_{Rt} \quad (78)$$

which may be written in matrix form as $$\hat{D} = D - C\Xi \quad (79)$$

where D and $\hat{D}$ are vectors of (scalar) branch displacements, $\Xi$ is the vector of node transformation displacements and C is the connection matrix of graph G, defined by $$C_{ij} = \begin{cases} +1 & \text{if } n_i = R_{tj} \text{ and } R_{tj} \neq L_{tj} \\ -1 & \text{if } n_i = L_{tj} \text{ and } R_{tj} \neq L_{tj} \\ 0 & \text{otherwise} \end{cases} \quad (80)$$

Our goal is to find $\Xi$ such that $$D - C\Xi \geq 0 \quad (81)$$

or, equivalently, $$C(-\Xi) \geq -D \quad (82)$$

Finding an integer solution to (82) is a problem in integer linear programming, with a trivial (zero) objective function. However, because the connection matrix of a directed graph is totally unimodular (TUM) (C. Papadimitriou and K. Steiglitz, Combinatorial Optimization, 1982, Englewood Cliffs: Prentice-Hall) the optimal vertices of (82) are always integer, even if the optimization is performed over arbitrary real values. Thus, it is sufficient to consider the corresponding linear program and look for any (i.e., not necessarily integer) solution to (82). By the duality theorem of linear programming (C. Papadimitriou and K. Steiglitz, Combinatorial Optimization, 1982, Englewood Cliffs: Prentice Hall) (82) has a solution if and only if the dual linear program $$\min D'\pi \quad (83)$$

subject to the constraints $$C\pi = 0 \quad (85)$$

$$\pi \geq 0 \quad (85)$$

has a finite optimum objective. Again, because C is TUM, the optimal vertices of this dual program will be integer. It is not difficult to show that a non-negative integer solution to $C\pi = 0$ corresponds to a set of loops in G and that $D'\pi$ is the corresponding total displacement of those loops. By assumption, the displacement of every loop in G is non-negative, so that $D'\pi \geq 0$. Thus, the minimum is attained when $\pi = 0$ and (83) indeed has a finite optimum.

What is claimed is:

1. For use in an image recognition system of noisy 2-d images, an imager based on an imaging model using stochastic finite state networks, said imager comprising: means for inputting an object to be imaged; means for constructing a bitmap image of the object by combining symbol templates selected from a library of templates on the basis of paths determined by a stochastic finite state network.

2. The imager of claim 1, wherein the finite state network comprises branches having a set of attributes including a label and a multidimensional displacement on the bitmap.

3. The imager of claim 2, wherein the symbol templates use a sidebearing model of symbol shape description and positioning.

4. In an image synthesis method, comprising the steps:
inputting an object to be imaged to an imager, inputting a stochastic finite state network for the class of objects to be imaged, providing a library of symbol templates, causing said imager to construct a bitmap image of the object by combining symbol templates selected from the library on the basis of paths determined by the stochastic finite state network.

5. The method of claim 4, wherein the symbol templates are derived from a sidebearing model of symbol description and positioning.

6. The method of claim 5, wherein the sidebearing model allows overlapping bounding boxes but not overlapping symbols.

7. The method of claim 4, wherein the symbol templates are derived from images containing samples of the symbols by estimating the font metrics using an estimation procedure.

8. The method of claim 7, wherein the estimation procedure is a least-squares procedure.

9. For use in an image recognition system, a decoder for reconstructing an object used to make a noisy 2-d bitmap image, said decoder including a library of symbol templates substantially corresponding to the symbols present in the object and a stochastic finite state network for parsing the bitmap image to reconstruct the object by combining symbol templates selected from the library of templates on the basis of paths determined by the stochastic finite state network.

10. The decoder of claim 9, wherein the finite state network comprises branches having a set of attributes including a label, an image displacement, and a node transition probability.

11. The decoder of claim 9, wherein the decoder further comprises computation means for doing computations and a scheduler for ordering the computations for determining the most likely path through the network.

12. The decoder of claim 11, wherein the computations include maintaining a score of matches of an image symbol to the templates in the library.

13. The decoder of claim 11, wherein the scheduler is a row-major linear scheduler.

14. The decoder of claim 9, wherein the network comprises a Markov source which each transition is labelled with a symbol template and a displacement and the symbol templates are based on a sidebearing model of the symbol.

15. In an image recognition method, comprising the steps: inputting to a decoder a noisy 2-d bitmap image to be reconstructed, inputting a stochastic finite state network for the class of objects represented by the image, providing a library of symbol templates substantially corresponding to object symbols of the image, causing said decoder to reconstruct the object by combining symbol templates selected from the library on the basis of paths determined by the stochastic finite state network.

16. The method of claim 15, wherein the symbol templates are derived from a sidebearing model of symbol description and positioning.

17. The method of claim 16, wherein the sidebearing model allows overlapping bounding boxes but not overlapping symbols.

18. The method of claim 15, wherein the symbol templates are derived from images containing samples of the symbols by estimating the font metrics using an estimation procedure.

19. The method of claim 18, wherein the estimation procedure is a least squares procedure.

20. In a noisy 2-d image recognition method comprising a stochastic finite state model of image generation for generating from a document comprising a plurality of characters a binary image from which the document can be intelligently reconstructed, the steps of:
   (a) determining glyph positioning in the bitmap by determining the sidebearing attributes of the glyph,
   (b) producing character templates representing each glyph positioned as determined in step (a),
   (c) parsing the binary image using a selection of the templates produced by step (b) following the paths of a stochastic finite state network to reconstruct the document.

21. In an image recognition method comprising a finite state model of image generation for generating from a document comprising a plurality of characters a binary image from which the document can be intelligently reconstructed, the steps of:
   (a) establishing character models from character samples used in the document by estimating the font metrics of each character using a least-squares procedure,
   (b) producing a template of each document character and using same and a Markov source to construct the image.

22. The method of claim 21, further comprising reconstructing the document from the image using a stochastic finite state automaton in which finite states of the model are based on the probability that the document character resembles one of the character models established in step (a).

23. An image recognition system comprising:
   an imager based on an imaging model comprising finite state networks and means for inputting an object to be imaged, said imager comprising means for constructing a bitmap image of the object by combining symbol templates selected from a library of templates on the basis of paths determined by a finite state network; and
   a decoder for reconstructing the object used to make a bitmap image, said decoder including a library of symbol templates substantially corresponding to the symbols present in the object and a finite state network for parsing the bitmap image to reconstruct the object by combining symbol templates selected from the library of templates on the basis of paths determined by the finite state network.

24. A text-like image recognition method for analyzing a bitmap image, comprising:
   (a) forming a decoding trellis comprising a stochastic finite state network based on Markov source models and Viterbi decoding, said source models having transitions and nodes and associated with each transition are a template, a transition probability, a message, and a 2-dimensional displacement,
   (b) providing a library of symbol templates each representing a possible symbol at points of the image plane, each point of the image plane being represented in the decoding trellis by nodes and transitions into each node,
   (c) finding the most likely path through said decoding trellis by said Viterbi decoding comprising executing a 2-dimensional Viterbi algorithm in which the likelihood of an individual transition of a path comprises the transition probability of the transition and the likelihood that the symbol template from the library associated with the transition corresponds to the region of the image in the vicinity of said image point,
   (d) combining the symbol templates and messages associated with the transitions of the said most likely path.

25. An image recognition process for reconstructing from a bitmap image a text-like document, comprising:
   (a) forming an image network based on a hidden markov source imaging model using stochastic finite state networks, said image network having a set of nodes interconnected by directed transitions and with a start state and a final state and with each transition associated with attributes comprising a character label, an image template including a 2-dimensional displacement and a transition probability,
   (b) synthesizing an output image representing the bitmap image by traversing a path through the image network and at each transition copying into the output the template attribute associated with that transition where the transitions of the path are selected on the basis of a maximum score computed by iterating over the transitions into each node, the maximum score indicating the most likely path into the node.

26. The method of claim 25, wherein the source imaging model is a sidebearing model of character shape description and spacing.

* * * * *